(12) United States Patent
Yoshimura et al.

(10) Patent No.: US 10,089,421 B2
(45) Date of Patent: Oct. 2, 2018

(54) INFORMATION PROCESSING APPARATUS AND INFORMATION PROCESSING METHOD

(71) Applicants: Hitachi, Ltd., Chiyoda-ku, Tokyo (JP); Inter-University Research Institute Corporation, Research Organization of Information and Systems, Tachikawa, Tokyo (JP)

(72) Inventors: Chihiro Yoshimura, Tokyo (JP); Masanao Yamaoka, Tokyo (JP); Ken-ichi Kawarabayashi, Tokyo (JP); Takuro Fukunaga, Tokyo (JP); Taro Takaguchi, Tokyo (JP); Takanori Maehara, Tokyo (JP); Takuya Ohwa, Tokyo (JP)

(73) Assignees: HITACHI, LTD., Tokyo (JP); INTER-UNIVERSITY RESEARCH INSTITUTE CORPORATION, RESEARCH ORGANIZATION OF INFORMATION AND SYSTEMS, Tokyo (JP)

( * ) Notice: Subject to any disclaimer, the term of this patent is extended or adjusted under 35 U.S.C. 154(b) by 691 days.

(21) Appl. No.: 14/645,815

(22) Filed: Mar. 12, 2015

(65) Prior Publication Data
US 2015/0278408 A1    Oct. 1, 2015

(30) Foreign Application Priority Data
Mar. 27, 2014  (JP) ................................ 2014-066874

(51) Int. Cl.
*G06F 7/60*    (2006.01)
*G06F 17/10*    (2006.01)
(Continued)

(52) U.S. Cl.
CPC .......... *G06F 17/5009* (2013.01); *G06F 17/11* (2013.01); *G06N 7/005* (2013.01);
(Continued)

(58) Field of Classification Search
None
See application file for complete search history.

(56) References Cited

U.S. PATENT DOCUMENTS

2014/0046626 A1    2/2014 Yamamoto et al.

FOREIGN PATENT DOCUMENTS

JP    09-300180        11/1997
JP    2004-133802 A    4/2004
(Continued)

OTHER PUBLICATIONS

Bhandarkar, Suchendra M. et al., "Evolutionary Computation for Figure-Ground Separation", 1997, IEEE.*
(Continued)

*Primary Examiner* — Cedric Johnson
(74) *Attorney, Agent, or Firm* — Foley & Lardner LLP

(57) ABSTRACT

An information processing unit and information processing method capable of performing a ground-state search of an Ising model having coefficients of arbitrary values regardless of restrictions on hardware or software is suggested. When a ground state of an original problem, which is an Ising model, or an approximate solution of that ground state is calculated as a solution of the original problem, one or more sub-problems which are Ising models are generated from the original problem and the information processing unit searches the ground state of each generated sub-problem and generates a solution of the original problem based on a solution of each sub-problem obtained from the search; and when types of coefficient values of an Ising model whose ground state can be searched are limited, sub-prob-
(Continued)

lems which are Ising models composed of the types of limited values of coefficients are generated.

13 Claims, 38 Drawing Sheets

(51) Int. Cl.
*G06F 17/50* (2006.01)
*G06F 17/11* (2006.01)
*G06N 7/00* (2006.01)
*G06N 99/00* (2010.01)

(52) U.S. Cl.
CPC ...... *G06F 2217/10* (2013.01); *G06F 2217/16* (2013.01); *G06N 99/002* (2013.01)

(56) References Cited

FOREIGN PATENT DOCUMENTS

| | | |
|---|---|---|
| JP | 2012-217518 A | 11/2012 |
| WO | WO 2012/118064 A1 | 9/2012 |

OTHER PUBLICATIONS

Garcia, Hector J. et al., "Spinto: High-Performance Energy Minimization in Spin Glasses", 2010, IEEE.*

Bautu, Andrei et al., "Searching Ground States of Ising Spin Glasses with a Tree Bond-Based Representation", 2008, 10th International Symposium on Symbolic and Numeric Algorithms for Scientific Computing, IEEE Computer Society.*

Turchi, P et al., "Configurational Energies in Terms of Effective Cluster Interactions in Binary Substitutional Alloys: Connection between the Embedded Cluster Method and the Generalized Perturbation Method", 1989, Alloy Phase Stability, 509-514. (Year: 1989).*

Liers, Frauke, "Contributions to Determining Exact Ground-States of Ising Spin-Glasses and to Their Physics", 2004, Dissertation. (Year: 2004).*

Kadowaki, Tadashi et al., "Quantum Annealing in the Transverse Ising Model", Nov. 1998, Physical Review E, vol. 58, No. 5, The American Physical Society. (Year: 1998).*

\* cited by examiner

EXAMPLE OF DATA STRUCTURE REPRESENTING
ISING MODEL (DATA REPRESENTING
ORIGINAL PROBLEM AND SUB-PROBLEMS)

LEGEND

Vi    SPIN IDENTIFIER
Jij    INTERACTION COEFFICIENT (i-TH SPIN -> j-TH SPIN)
hi    EXTERNAL MAGNETIC FIELD COEFFICIENT (i-TH SPIN)

FIG.4

FORMAT EXAMPLE FOR DATA REPRESENTING
ISING MODEL (DATA REPRESENTING ORIGINAL
PROBLEM AND SUB-PROBLEMS)

PROBLEM DATA 400

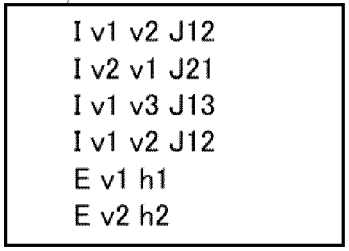

```
I v1 v2 J12
I v2 v1 J21
I v1 v3 J13
I v1 v2 J12
E v1 h1
E v2 h2
```

LEGEND

I     IDENTIFIER INDICATING INTERACTION COEFFICIENT DEFINITION PART
E     IDENTIFIER INDICATING EXTERNAL MAGNETIC COEFFICIENT DEFINITION
Vi     SPIN IDENTIFIER
Jij     INTERACTION COEFFICIENT (i-TH SPIN → j-TH SPIN)
Hi     EXTERNAL MAGNETIC FIELD COEFFICIENT (i-TH SPIN)

FORMAT EXAMPLE FOR DATA REPRESENTING
SPIN ALIGNMENT (CANDIDATE SOLUTIONS
AND DATA REPRESENTING SOLUTION)

500

| SOLUTION | |
|---|---|
| SPIN | SPIN VALUE |
| v1 | $\sigma 1$ |
| v2 | $\sigma 2$ |
| v3 | $\sigma 3$ |

SOLUTION DATA 550

$\sigma 1 \ \sigma 2 \ \sigma 3$

LEGEND
Vi     SPIN IDENTIFIER
$\sigma i$     VALUE OF i-TH SPIN (BINARY OF -1/+1)

V' = {v_0, v_3, v_4}
V'\V = {v_1, v_2, v_5}
w(V') = 5 + 4 + 3 + 2 + 3 + 5 + 1 = 23

V' = {$v_0, v_3, v_4$}
V'\V = {$v_1, v_2, v_5$}
w(V') = 5 + 4 + 3 + 2 + 4 + 5 = 23

GROUND-STATE (GLOBAL OPTIMAL SOLUTION)
ENERGY: −36
SPIN ALIGNMENT:

$\{v_0, v_1, v_2, v_3, v_4, v_5\}$ (1) $\{-1, +1, +1, +1, -1, -1\}$
  (2) $\{+1, -1, -1, -1, +1, +1\}$
  (3) $\{-1, +1, +1, -1, -1, +1\}$
  (4) $\{+1, -1, -1, +1, +1, -1\}$

ENERGY OF FEASIBLE SOLUTIONS
-36, -28, -24, -20, -12, -8, -4, 0,
4, 8, 12, 16, 20, 24, 32, 56

ORIGINAL PROBLEM DATA 1300

I 0 1-5
I 1 0-5
I 0 2-4
I 2 0-4
I 1 2-1
I 2 1-1
I 1 3-3
I 3 1-3
I 1 4-2
I 4 1-2
I 2 4-3
I 4 2-3
I 3 4-4
I 4 3-4
I 3 5-5
I 5 3-5
I 4 5-1
I 5 4-1
E 0 0
E 1 0
E 2 0
E 3 0
E 4 0
E 5 0

FIG.15
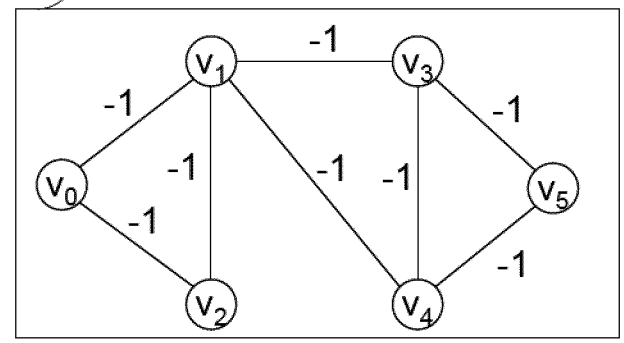
SUB-PROBLEM 1501
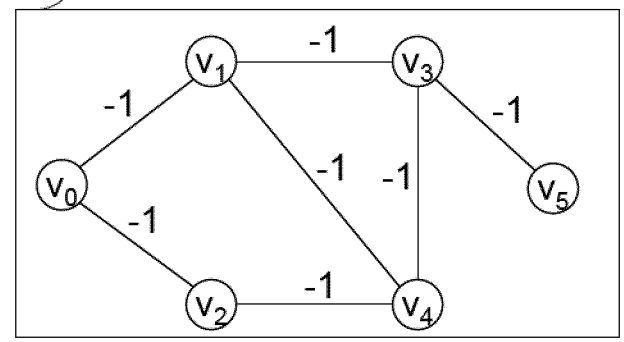
SUB-PROBLEM 1502
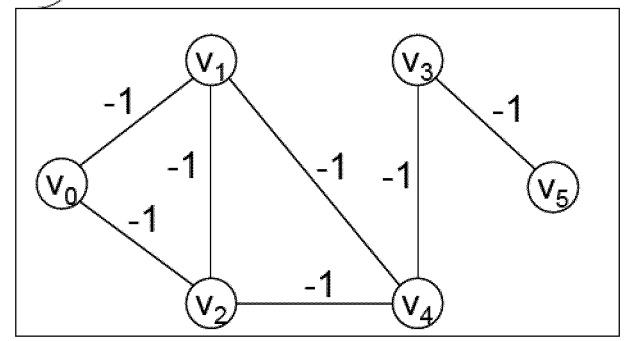
SUB-PROBLEM 1503

FIG.16

CANDIDATE SOLUTION DATA 1601

+1 −1 −1 +1 +1 −1

(ENERGY OF SUB-PROBLEM : -8)
(ENERGY OF ORIGINAL PROBLEM : -36)

CANDIDATE SOLUTION DATA 1602

−1 −1 +1 +1 −1 −1

(ENERGY OF SUB-PROBLEM : -8)
(ENERGY OF ORIGINAL PROBLEM : -24)

CANDIDATE SOLUTION DATA 1603

−1 +1 +1 −1 −1 +1

(ENERGY OF SUB-PROBLEM : -6)
(ENERGY OF ORIGINAL PROBLEM : -36)

FIG.17

SOLUTION DATA 1701

+1 -1 -1 +1 +1 -1
-1 +1 +1 -1 -1 +1

(ENERGY OF ORIGINAL PROBLEM : -36)

SOLUTION DATA 1801

−1 −1 +1 +1 −1 −1

(ENERGY OF ORIGINAL PROBLEM : −24)

FIG.26

RESULTS OF SOLUTIONS OBTAINED WHEN GENERATING 1000 SUB-PROBLEMS, LISTING POSSIBLE SOLUTIONS (TOTAL OF 10332 CASES) AS RESULTS AFTER GROUND-STATE SEARCH OF EACH OF THE SUB-PROBLEMS, AND EVALUATING EACH SOLUTION WITH RESPECT TO ORIGINAL PROBLEM

ENERGY OBTAINED WHEN EVALUATING CANDIDATE SOLUTIONS WITH RESPECT TO ORIGINAL PROBLEM
(UPPER ROW: RANK ORDER WITHIN ENERGY THAT CAN BE GENERATED; AND
LOWER ROW: ENERGY VALUE)

|       | 1     | 2     | 3    | 4    | 5     |
|-------|-------|-------|------|------|-------|
|       | −36   | −28   | −24  | −20  | −12   |
| 1     | 14.0% | 9.5%  | 3.8% | 0.4% | 9.1%  |
| 2     | 16.5% | 11.2% | 3.3% | 1.5% | 4.5%  |
| 3     | 4.1%  | 0.1%  | 0.0% | 0.0% | 0.0%  |
| Total | 34.5% | 20.8% | 7.2% | 1.9% | 13.6% |

|       | 6     | 7    | 8    | 9    | 10   |
|-------|-------|------|------|------|------|
|       | −8    | −4   | 0    | 4    | 8    |
| 1     | 9.3%  | 5.0% | 0.5% | 0.2% | 1.0% |
| 2     | 4.4%  | 0.9% | 0.2% | 0.1% | 0.1% |
| 3     | 0.3%  | 0.0% | 0.0% | 0.0% | 0.0% |
| Total | 14.0% | 5.8% | 0.7% | 0.3% | 1.1% |

SOLUTION RANK ORDER OF CANDIDATE SOLUTIONS OF SUB-PROBLEMS

FIG. 27

RESULTS OF SOLUTIONS OBTAINED WHEN GENERATING 1000 SUB-PROBLEMS, LISTING POSSIBLE SOLUTIONS (TOTAL OF 9678 CASES) AS RESULTS AFTER GROUND-STATE SEARCH OF EACH OF THE SUB-PROBLEMS, AND EVALUATING EACH SOLUTION WITH RESPECT TO ORIGINAL PROBLEM

ENERGY OBTAINED WHEN EVALUATING CANDIDATE SOLUTIONS WITH RESPECT TO ORIGINAL PROBLEM
(UPPER ROW: RANK ORDER WITHIN ENERGY THAT CAN BE GENERATED; AND
LOWER ROW: ENERGY VALUE)

|       | 1     | 2     | 3     | 4     | 5     |
|-------|-------|-------|-------|-------|-------|
|       | −36   | −28   | −24   | −20   | −12   |
| 1     | 10.1% | 3.9%  | 2.1%  | 0.5%  | 1.9%  |
| 2     | 10.1% | 12.1% | 7.8%  | 0.7%  | 10.8% |
| 3     | 5.9%  | 0.6%  | 0.2%  | 0.7%  | 1.6%  |
| Total | 26.1% | 16.7% | 10.1% | 1.8%  | 14.3% |

|       | 6     | 7     | 8     | 9     | 10    |
|-------|-------|-------|-------|-------|-------|
|       | −8    | −4    | 0     | 4     | 8     |
| 1     | 7.8%  | 1.0%  | 1.1%  | 0.0%  | 0.7%  |
| 2     | 10.0% | 2.3%  | 2.2%  | 0.4%  | 1.3%  |
| 3     | 1.2%  | 0.5%  | 0.5%  | 0.0%  | 0.1%  |
| Total | 19.0% | 3.8%  | 3.7%  | 0.5%  | 2.2%  |

|       | 11    | 12    | 13    | 14    | 15    |
|-------|-------|-------|-------|-------|-------|
|       | 12    | 16    | 20    | 24    | 32    |
| 1     | 0.0%  | 0.1%  | 0.0%  | 0.4%  | 0.0%  |
| 2     | 0.1%  | 0.4%  | 0.2%  | 0.3%  | 0.1%  |
| 3     | 0.0%  | 0.0%  | 0.0%  | 0.0%  | 0.0%  |
| Total | 0.1%  | 0.5%  | 0.2%  | 0.8%  | 0.1%  |

SOLUTION RANK ORDER OF CANDIDATE SOLUTIONS OF SUB-PROBLEMS

FIG.31
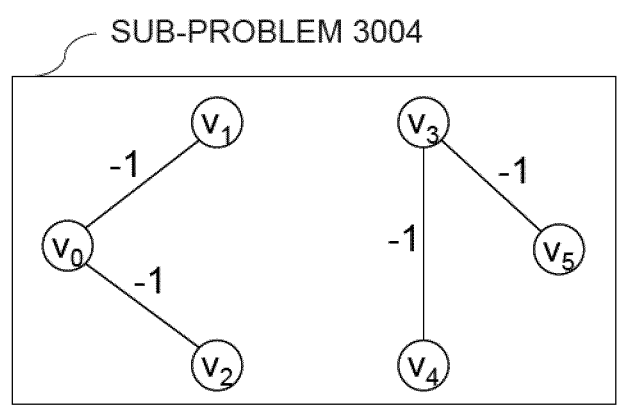
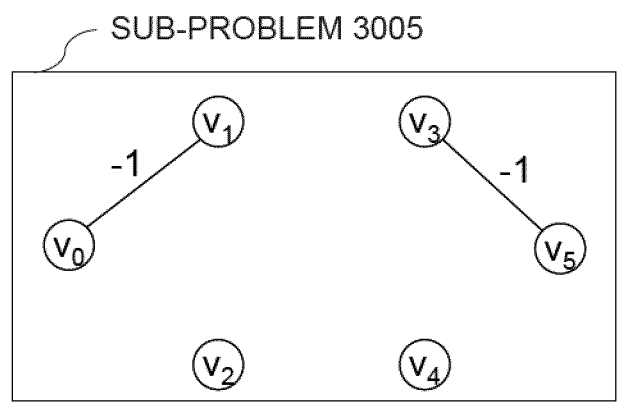

FIG.32

| SUB-PROBLEM | v0 | v1 | v2 | v3 | v4 | v5 | ENERGY OF SUB-PROBLEM | ENERGY OF ORIGINAL PROBLEM |
|---|---|---|---|---|---|---|---|---|
| 3001 | -1 | +1 | +1 | -1 | -1 | +1 | -10 | -36 |
| 3002 | -1 | +1 | +1 | +1 | -1 | -1 | -10 | -36 |
| 3003 | -1 | -1 | +1 | +1 | -1 | -1 | -8 | -24 |
| 3004 | -1 | +1 | +1 | -1 | +1 | +1 | -8 | -28 |
| 3005 | -1 | +1 | -1 | -1 | -1 | +1 | -4 | -12 |

| REPRESENTATIVE VALUE | v0 | v1 | v2 | v3 | v4 | v5 | ENERGY OF ORIGINAL PROBLEM |
|---|---|---|---|---|---|---|---|
| MODE | -1 | +1 | +1 | -1 | -1 | +1 | -36 |

| REPRESENTATIVE VALUE | v0 | v1 | v2 | v3 | v4 | v5 | ENERGY OF ORIGINAL PROBLEM |
|---|---|---|---|---|---|---|---|
| QUANTITY 1 | -1 | -1 | -1 | -1 | -1 | -1 | 56 |
| QUANTITY 2 | -1 | +1 | +1 | -1 | -1 | -1 | -12 |
| QUANTITY 3 | -1 | +1 | +1 | -1 | -1 | +1 | -36 |
| QUANTITY 4 | -1 | +1 | +1 | +1 | +1 | +1 | 20 |
| QUANTITY 5 | -1 | +1 | +1 | +1 | +1 | +1 | 20 |

INFORMATION PROCESSING APPARATUS AND INFORMATION PROCESSING METHOD

CROSS-REFERENCES TO RELATED APPLICATIONS

This application relates to and claims priority from Japanese Patent Application No. 2014-066874, filed on Mar. 27, 2014, the entire disclosure of which is incorporated herein by reference.

BACKGROUND

Field of the Invention

The present invention relates to an information processing unit and an information processing method. Particularly, the invention is suited for use in an information processing unit that performs a ground-state search of an Ising model.

Description of Related Art

The Ising model is a model of statistical dynamics to explain behaviors of a magnetic substance. The Ising model is defined by spins having two values, that is, +1/−1 (or 0/1 or up/down), an interaction coefficient indicative of an interaction between the spins, and an external magnetic field coefficient for each spin.

Energy of the Ising model at the relevant time can be calculated from a spin alignment, the interaction coefficient, and the external magnetic field coefficient which are defined. An energy function of the Ising model can be generally represented by the following expression.

[Math. 1]

$$E(s) = -\sum_{i<j} J_{i,j}\sigma_i\sigma_j - \sum_i h_i\sigma_i \quad (1)$$

Incidentally, $\sigma_i$ and $\sigma_j$ represent i-th and j-th spin values, respectively; $J_{i,j}$ represents the interaction coefficient between the i-th and j-th spins; $h_i$ represents the external magnetic field coefficient for the i-th spin; and $\sigma$ represents the spin alignment.

A first term of Expression (1) is to calculate energy attributable to the interaction between the spins. Generally, the Ising model is expressed as an undirected graph and does not distinguish between an interaction from the i-th spin to the j-th spin or an interaction from the j-th spin to the i-th spin. Therefore, the first term calculates the influence of the interaction coefficient with respect to a combination of $\sigma_i$ and $\sigma_j$ that satisfy i<j. Also, a second term is to calculate energy attributable to the external magnetic field for each spin.

A ground-state search of the Ising model is an optimization problem to find a spin alignment that minimizes the energy function of the Ising model. It is known that when the range of the interaction coefficient and the external magnetic field coefficient is not limited, finding the ground state of the Ising model whose topology becomes a nonplanar graph is an NP-hard problem.

The ground-state search of the Ising model is used not only to explain behaviors of a magnetic substance which is originally a target of the Ising model, but also for various uses. This can be because the Ising model is the simplest model based on interactions and also has the capability to express various phenomena attributable to interactions. For example, Japanese Patent Application Laid-Open (Kokai) Publication No. 2012-217518 discloses a method for estimating the degree of stress in a group such as a workplace organization by using the ground-state search of the Ising model.

Furthermore, the ground-state search of the Ising model also deals with a maximum cut problem known as an NP-hard graph problem. Such a graph problem is widely applicable to, for example, community detection in social networks and segmentation for image processing. Therefore, any solver that performs the ground-state search of the Ising model can be applied to such various problems.

Since finding the ground state of the Ising model is an NP-hard problem as described above, solving the problem with von Neumann computers is difficult in terms of calculation time. While an algorithm that introduces heuristics to increase the speed is suggested, there is suggested a method of finding the ground state of the Ising model at high speeds, without using the von Neumann computers, by calculation that utilizes physical phenomena more directly, that is, by using analogue computers. For example, there is an apparatus described in WO2012/118064 as an example of the above-described apparatus.

Assuming hardware having the configuration that corresponds to Ising models one-on-one, types of coefficient values which the hardware can retain are limited.

The types of coefficient values represent individual coefficients that can be used specifically. The hardware cannot handle arbitrary real numbers with unlimitedly high precision. In many cases, values which can be directly supported by the hardware are integer numbers which are discrete values. Moreover, when the hardware supports real numbers as fixed point numbers and floating point numbers, their precision is actually limited and can be considered as discrete values. Furthermore, in any of the cases, it is physically difficult to prepare values which can fully cover the range, so that it is assumed that available coefficient values will be sparse.

Even with the hardware on which coefficients are mounted in an analogue manner, actually available coefficients are limited to a limited number of discrete values due to influences of a dynamic range or noise level of the hardware. Furthermore, there is a possibility that the size of the available coefficients may not be maintained to be uniform depending on the configuration of the hardware and ununiform coefficients may be provided. Therefore, specifically what type of values is available becomes a problem and this is called the types of coefficients. Specifically speaking, some hardware supports five types of coefficients such as +2, +1, 0, −1, −2, and some hardware supports four types of coefficients such as +2, +0.5, 0, −2. Furthermore, coefficients that increase in units of tenfold such as +100, +10, +1, 0, −1, −10, −100 may sometimes be provided. In other words, the coefficients may not be simply discrete values with equal intervals between adjacent values and the intervals may vary.

Such hardware may possibly use storage devices such as memory cells to retain the coefficients and use functional units or amplifiers to cause influences of the size of the coefficients. Accordingly, the types of the coefficient values are restricted by, for example, the bit width of the memory cell and the functional unit and the dynamic range of the amplifier.

Furthermore, since it is generally necessary to deliberately control many hardware resources and irregularity at the time of manufacturing in order to expand the bit width and the dynamic range, this will result in an increase in an amount of materials and costs. From this point of view as well, while the configuration of the hardware which realizes arbitrary coefficients can be thought of theoretically, only certain limited types of coefficient values can provided realistically. As an example, it is assumed that such coefficients may be only two values of +1 and −1 or only three values of +1, 0, and −1.

Furthermore, even when a solver that performs a ground-state search of an Ising model is implemented using software, the types of the coefficient values that the solver can deal with are limited, in the same manner as in the case of the ground-state search of the Ising model by the hardware, due to restrictions attributable to, for example, data structures to retain the coefficients in a memory for a computer which executes the solver.

For example, $|V|$ represents the number of spins (corresponding to the number of vertexes in a graph) in an Ising model; and $|E|$ represents the average number of interaction coefficients that each spin has (corresponding to an average degree in a graph). Assuming that a memory that can be allocated to the solver is N bits and the bit width of an interaction coefficient is k bits, only a model that satisfies the following expression can be used.
[Math. 2]

$$(|V| \times |E| \times k) \leq N \qquad (2)$$

Particularly, if an attempt is made to expand the bit width k of the interaction coefficient, that is, to expand the types of the coefficient values, it is necessary to reduce the number of spins $|V|$ or the topology of the Ising model (the average number of interaction coefficients $|E|$ for each spin).

It is possible to make efforts to increase the memory amount N which can be allocated to the solver by, for example, preparing virtual storage on a computer platform where the solver is made to operate; however, even if the solver is realized by using the software, the fact remains that the types of the coefficient values which can be handled by the Ising model are still restricted by the hardware.

Consequently, although the ground-state search of the Ising model exhibits industrially useful applicability, the types of the coefficient values are limited by the restrictions of the hardware when implementing the solver which performs the ground-state search; and apparently, the problem is that types of Ising models which can be input to the solver are limited.

It should be noted that conventionally, in the field of combinatorial optimization problems in which von Neumann computers are used to perform such a search, the computational complexity explodes exponentially relative to the input size of a problem. So, types of values constituting the problem have rarely become a problem. Instead, the explosion of the computational complexity in the search processing after inputting the problem has been a controlling problem. Therefore, for example, a branch-and-bound method and heuristics to reduce the computational complexity by utilizing characteristics of the problem have been used as described in Japanese Patent Application Laid-Open (Kokai) Publication No. 2004-133802 and Japanese Patent Application Laid-Open (Kokai) Publication No. Hei 9-300180.

So, the types of the coefficient values which can be input to the solver were never a problem in the past in the first place, besides the computational complexity as mentioned above. However, as it has become possible to perform an NP-hard ground-state search of the Ising model at high speeds as in a case of the apparatus described in WO2012/118064, the computational complexity problem has been solved. Then, the above-described problem has arisen as a new problem.

The present invention was devised in consideration of the above-described circumstances and aims at suggesting an information processing unit and information processing method capable of performing a ground-state search of an Ising model having coefficients of arbitrary values regardless of restrictions on hardware or software.

SUMMARY

In order to solve the above-described problems, an information processing unit calculating a ground state which is a spin alignment with minimum energy of an original problem that is an Ising model, or an approximate solution of the ground state as a solution of the original problem is provided according to an aspect of the present invention, wherein the information processing unit includes: a sub-problem generation unit that generates one or more sub-problems, which are Ising models, from the original problem; a ground-state search unit that searches for the ground state of a problem of an Ising model having specified multiple types of coefficient values and searches for the ground state of each of the sub-problems generated by the sub-problem generation unit; and the solution generation unit that generates a solution of the original problem based on a solution of each sub-problem obtained by the search by the ground-state search unit; wherein the sub-problem generation unit generates the sub-problems which are the Ising models having one or more coefficient values selected from the multiple types based on one or more coefficient values of the Ising model of the original problem.

Furthermore, provided according to another aspect of the present invention is an information processing method executed by an information processing unit that: includes a ground-state search unit that searches for a ground-state which is a spin alignment to minimize energy of a problem of an Ising model having specified multiple types of coefficient values, and calculates a ground state of an original problem that is an Ising model, or an approximate solution of the ground state as a solution of the original problem, wherein the information processing method includes: a first step executed by the information processing unit generating one or more sub-problems, which are Ising models, from the original problem which is the Ising model; a second step executed by the information processing unit searching for the ground state of each of the sub-problems generated by the sub-problem generation unit; and a third step executed by the information processing unit generating the solution of the original problem based on a solution of each sub-problem obtained by the search; wherein in the first step, the sub-problem or sub-problems which are the Ising models composed of one or more coefficient values selected from the multiple types are generated based on one or more coefficient values of the Ising model of the original problem.

Even if the type of a coefficient value of the Ising model, whose ground state can be searched, is limited by restrictions on hardware or software, the above-described information processing unit and information processing method can find a solution of an original problem of the Ising model composed of coefficients other than that type.

The information processing unit and the information processing method capable of performing a ground-state search of the Ising model having a coefficient of an arbitrary value regardless of restrictions on hardware or software can be implemented according to the present invention.

BRIEF DESCRIPTION OF THE DRAWINGS

FIG. 4 is a diagram illustrating an example of a data format representing the Ising model;

FIG. 13 is a graph that visualizes the sub-problems in FIG. 14;

FIG. 16 is an example of candidate solution data obtained by performing a ground-state search of the sub-problems in FIG. 12;

FIG. 17 is an example of a solution of the original problem obtained from the candidate solution data in FIG. 16;

FIG. 26 is a diagram illustrating quality of solutions obtained by the ground-state search of the Ising model according to the present invention;

FIG. 27 is a diagram illustrating quality of solutions obtained by the ground-state search of the Ising model according to the present invention;

FIG. 31 is an example of data representing sub-problems generated from the original problem in FIG. 12;

FIG. 32 is a diagram illustrating an example of candidate solutions obtained by performing a ground-state search of the sub-problems in FIG. 30 and FIG. 31 and solutions obtained from the candidate solution;

DETAILED DESCRIPTION OF PREFERRED EMBODIMENTS

An embodiment of the present invention will be described below in detail with reference to the attached drawings.

(1) First Embodiment (1-1) Ising Model Extended to Directed Graph

In the present embodiment, a model extended from an Ising model and represented by the following expression will be hereinafter referred to as the Ising model.

[Math. 3]

$$E(s) = -\sum_{i \neq j} J_{i,j} \sigma_i \sigma_j - \sum_i h_i \sigma_i \qquad (3)$$

The difference between the Ising model represented by Expression (1) and the model represented by Expression (3) is that Expression (3) permits interactions as shown in a directed graph. Generally, the Ising model can be drawn as an undirected graph according to graph theory. This is because interactions of the Ising model do not distinguish between an interaction coefficient $J_{i,j}$ from the i-th spin to the j-th spin and an interaction coefficient $J_{j,i}$ from the j-th spin to the i-th spin.

Since the present invention can be applied even by extending the Ising model and distinguishing between $J_{i,j}$ and $J_{j,i}$, the Ising model which is formed into a directed graph is handled in the present embodiment. Incidentally, if the Ising model which is an undirected graph is to be handled by using the Ising model which is a directed graph, it can be done simply by defining the same interaction coefficient for two directions, that is, $J_{i,j}$ and $J_{j,i}$. In this case, even if the same model is used, a value of the energy of the energy function according to Expression (3) is twice as much as the energy of the energy function according to Expression (1).

(1-2) Full Picture of Present Invention

Figure 1:
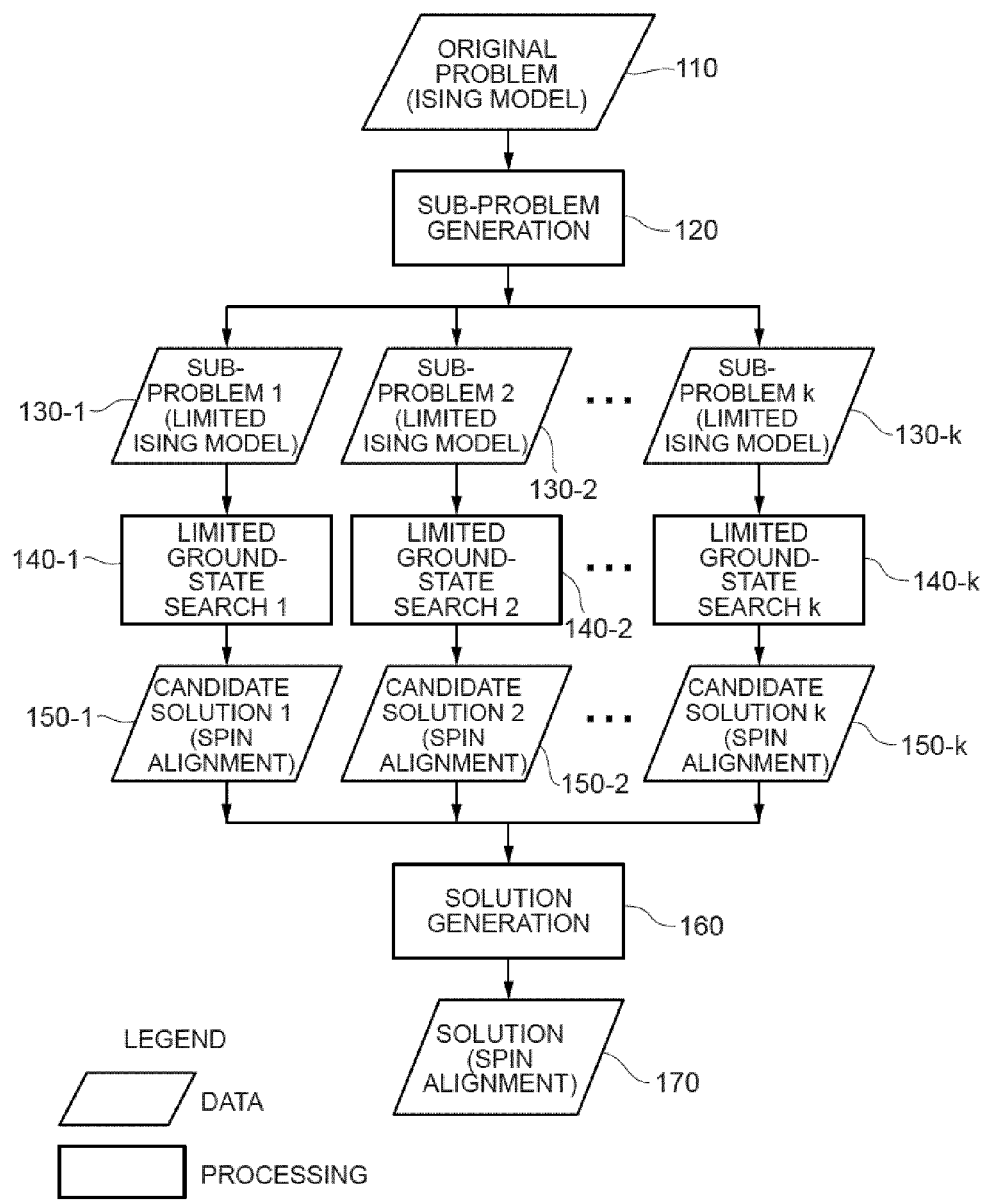
FIG. 1 is a diagram illustrating a flow of processing for a ground-state search of an Ising model according to the present invention.

FIG. 1 illustrates a flow of processing for performing a ground-state search of an Ising model according to the present invention. It is an object of the present invention to obtain a solution 170 of a spin alignment, that is, a ground state of an original problem 110 which is an arbitrary Ising model. When doing so, the solution 170 is obtained by using k pieces of (one or more) limited ground-state searches 140-1 to 140-k with limited types of coefficient values which can be input. The limited ground-state searches 140-1 to 140-k are implemented in an information processing unit 200 or information processing unit 2500 described later; and the k pieces of limited ground-state searches may be executed in parallel at the same time or a single limited ground-state search may be executed k times.

In the present embodiment, the limited ground-state searches 140-1 to 140-k will be described assuming that only three values, +1, 0, and −1, can be used as the interaction coefficients and the external magnetic field coefficients.

In order to perform the ground-state search of the original problem 110 by using the limited ground-state searches 140-1 to 140-k, k pieces of (one or more) sub-problems 130-1 to 130-k are generated from the original problem 110 at sub-problem generation 120. These sub-problems 130-1 to 130-k are composed of only the interaction coefficients and external magnetic field coefficients which are accepted by the limited ground-state searches 140-1 to 140-k. In the present embodiment, specifically speaking, the sub-problem generation 120 generates the sub-problems 130-1 to 130-k by using only the three values, +1, 0, and −1, for the interaction coefficients and the external magnetic field coefficients.

The ground-state search of each of these sub-problems 130-1 to 130-k is performed by the limited ground-state searches 140-1 to 140-k to generate candidate solutions 150-1 to 150-k. Each of the candidate solutions 150-1 to 150-k is a solution for the sub-problem 130-1 to 130-k and becomes a candidate solution of the original problem 110 (and, therefore, it is referred to as the candidate solution).

Incidentally, the candidate solution 150-1 to 150-k output from the limited ground-state search 140-1 to 140-k may not necessarily be a global optimal solution of the sub-problem 130-1 to 130-k. The candidate solution 150-1 to 150-k may not be the best spin alignment to minimize the energy, but may be a spin alignment with second or third low energy, that is, an approximate solution. The present invention can be applied even if the limited ground-state searches 140-1 to 140-k are approximate solutions.

The solution 170 of the original problem 110 is generated at solution generation 160 from the candidate solutions 130-1 to 130-k obtained from the obtained limited ground-state searches 140-1 to 140-k. As a result, the original purpose of obtaining the solution 170 of the original problem 110 can be achieved by using the limited ground-state searches 140-1 to 140-k.

Figure 2:
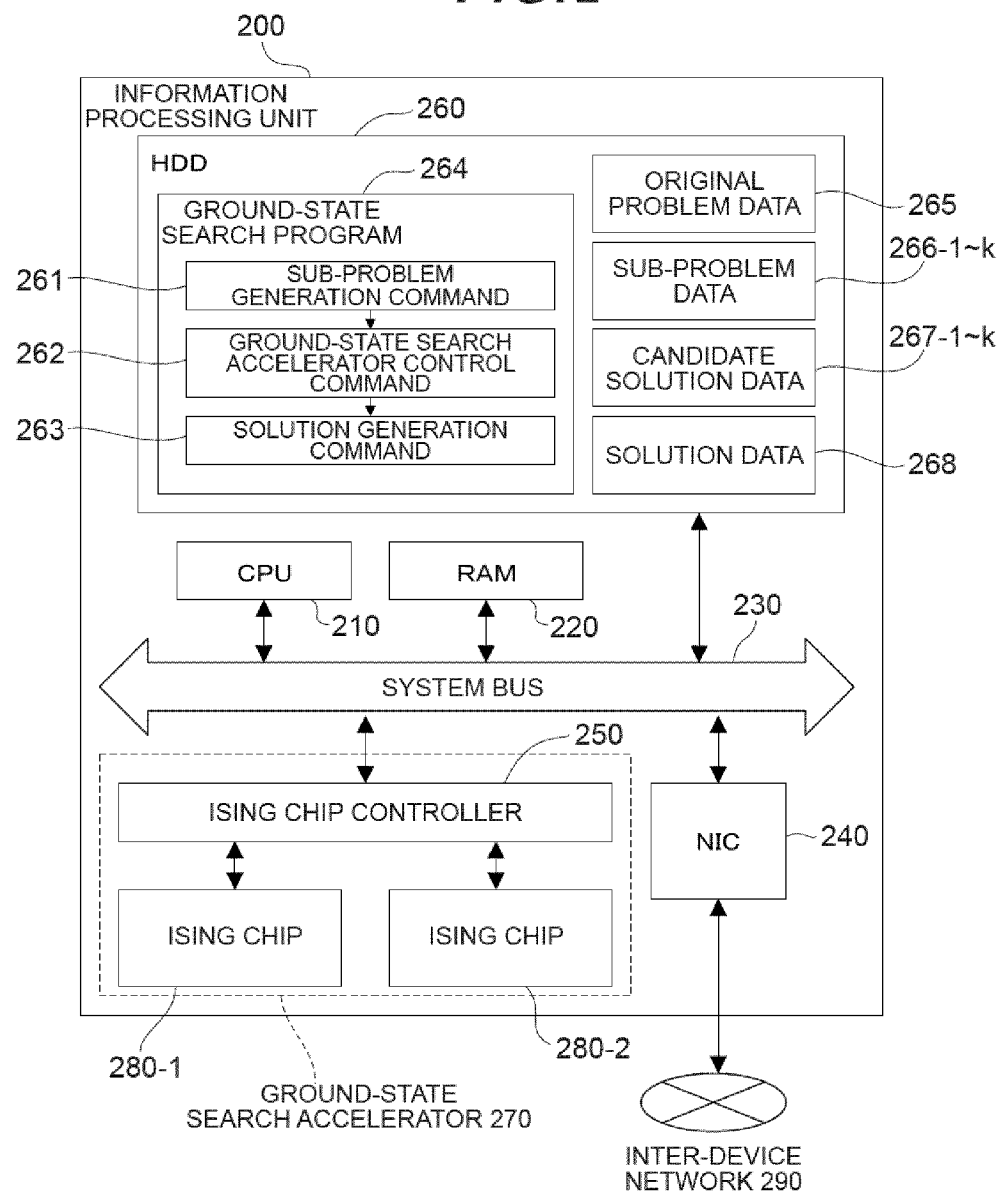
FIG. 2 is a diagram illustrating an example of the configuration of an apparatus that performs the ground-state search of the Ising model according to the present invention.

The present invention is implemented by using the information processing unit 200 as shown in FIG. 2. This information processing unit 200 may possibly be a personal computer (PC), workstation, or server which is currently widely used and is configured in a form where constituent elements such as a CPU (Central Processing Unit) 210, a RAM (Random Access Memory) 220, an HDD (Hard Disk Drive) 260, and an NIC (Network Interface Card) 240 which communicates to the Inter-Device Network 290, are connected via a system bus 230. In the present embodiment, it is assumed that this information processing unit 200 includes a ground-state search accelerator 270 which is dedicated hardware performing ground-state searches of Ising models as described in the background of the present invention.

By taking a personal computer as an example, the ground-state search accelerator 270 may be considered to take a form of an expansion card to be mounted on the information processing unit 200 like a GPU (Graphics Processing Unit) which is dedicated hardware for screen plotting processing.

The ground-state search accelerator 270 is composed of an Ising chip controller 250 that arranges one or more Ising chips 280-1, 280-2, each of which is dedicated hardware for performing, for example, a ground-state search of one Ising model, controls them, and mediates communications with a host (CPU 210). Under this circumstance, it is assumed that regarding Ising models whose ground-state can be searched by the Ising chips 280-1, 280-2, the interaction coefficients and the external magnetic field coefficients are limited to the three values, +1, 0, and −1. In other words, the limited ground-state searches 140-1 to 140-k in FIG. 1 correspond to the ground-state search accelerator 270.

The information processing unit 200 includes a ground-state search program 264, original problem data 265, sub-problem data 266-1 to 266-k, candidate solution data 267-1 to 267-k, and solution data 268 in an HDD 260. After the original problem data 265 is input to the ground-state search program 264, the solution data 268 is output as illustrated in the flow of processing in FIG. 1.

The ground-state search program 264 is composed of a sub-problem generation command 261, a ground-state search accelerator control command 262, and a solution generation command 263. After the original problem data 265 is input to the ground-state search program 264, the sub-problem generation command 261 is executed internally and the sub-problem data 266-1 to 266-k are generated. Then, after the sub-problem data 266-1 to 266-k are input to the ground-state search accelerator control command 262, the ground-state search accelerator control command 262 controls the ground-state search accelerator 270, has the Ising chips 280-1 and 280-2 perform the ground-state searches of the Ising models as defined in the sub-problem data 266-1 to 266-k, writes the search results as the candidate solution data 267-1 to 267-k to the HDD 260. Then, the solution generation command 263 reads the candidate solution data 267-1 to 267-k and generates the solution data 268.

Figure 25:
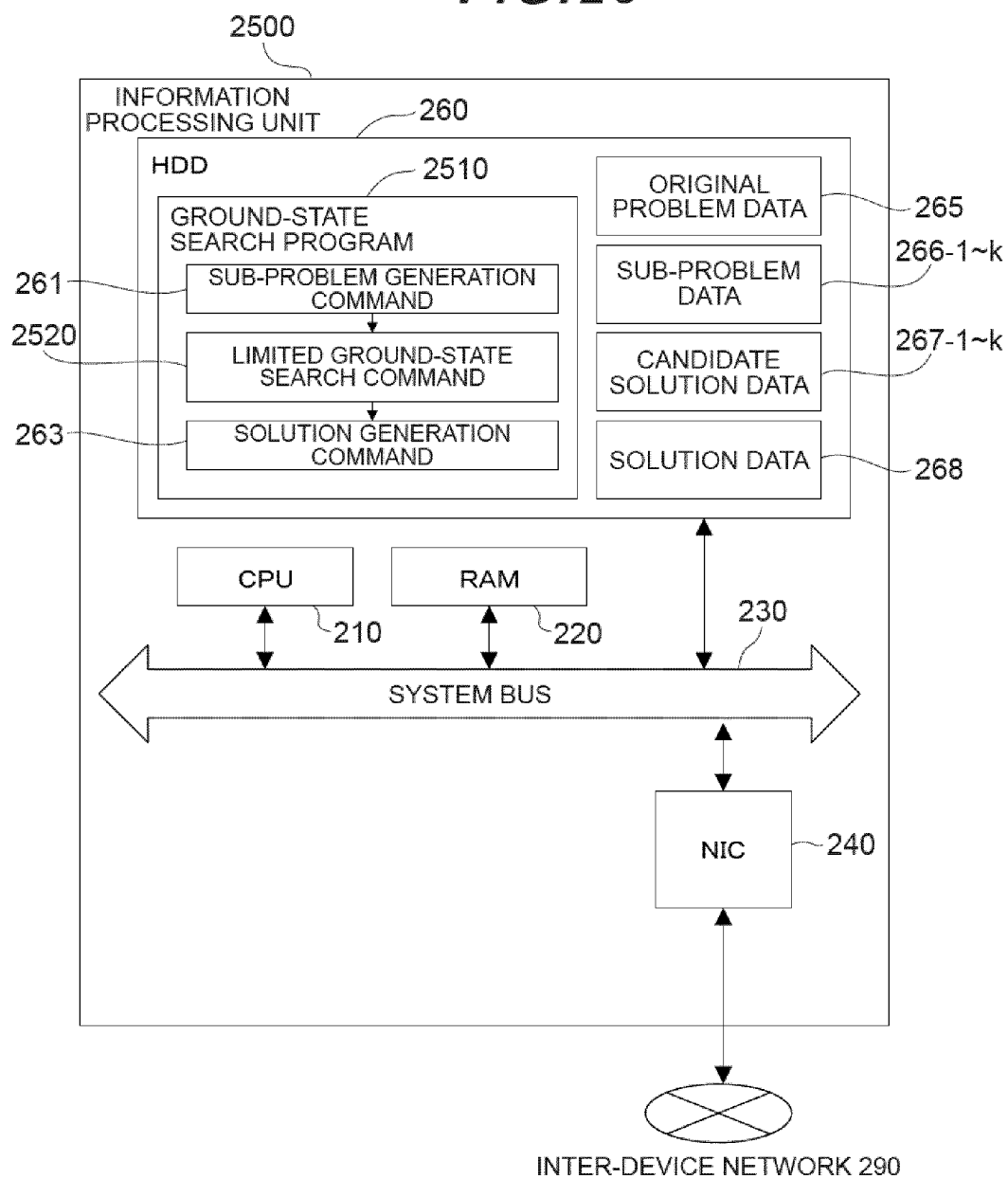
FIG. 25 is a diagram illustrating an example of the configuration of an apparatus that performs the ground-state search of the Ising model according to the present invention.

Furthermore, an information processing unit that does not have any dedicated hardware and has software performing the ground-state searches (the limited ground-state search command 2520) like the information processing unit 2500 as shown in FIG. 25 may can be applied as the information processing unit 200. The software performing the ground-state search may possibly be limited by the types of coefficient values in the same manner as the dedicated hardware as stated in the background of the present invention.

Incidentally, the detailed configuration of the hardware such as the Ising chips 280-1 and 280-2 will be explained later; and also it will be explained later that, as mentioned in the background of this description, only the types of limited values of coefficients can be provided due to the configuration of such hardware.

Even if means for searching for the ground state is implemented by the dedicated hardware (the ground-state search accelerator 270) as with the information processing unit 200 in FIG. 2 or by the software (the limited ground-state search command 2520) as with the information processing unit 2500 in FIG. 25, according to the present invention it is possible to provide the ground-state search program 264 or 2510 that implements ground-state searches of Ising models of arbitrary coefficients by similarly using the sub-problem generation command 261 and the solution generation command 263 as a preprocessor (pre-pre-processing) and a post-processor (post-processing) of the ground-state searches.

(1-3) Data Structure and Format to Represent Ising Model

Figure 3:
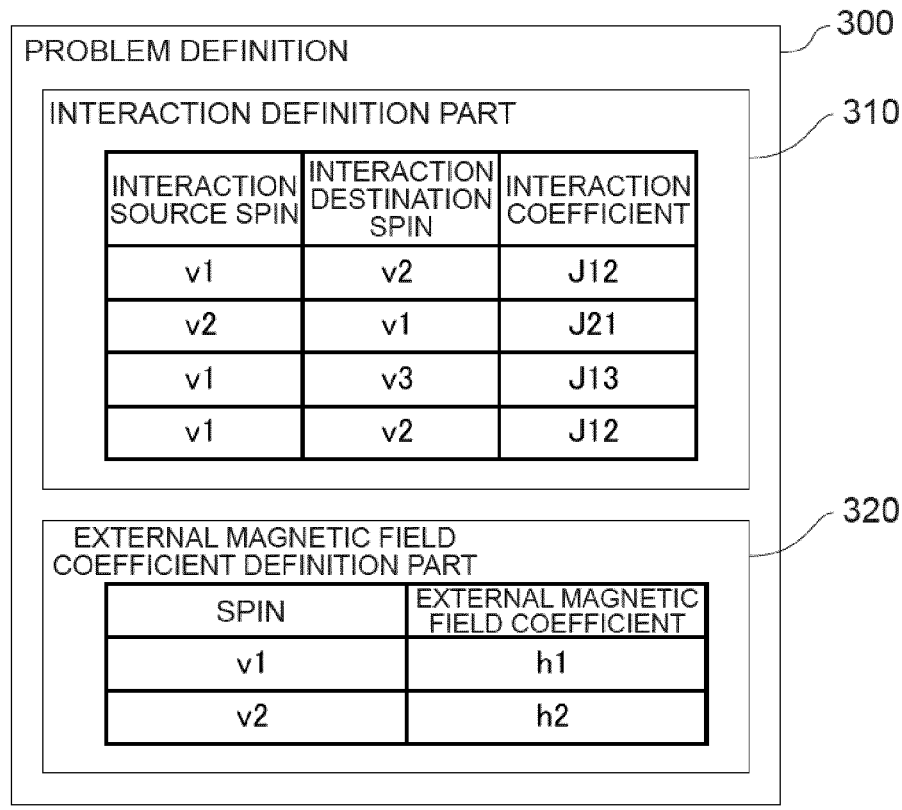
FIG. 3 is a diagram illustrating an example of a data structure representing the Ising model.

FIG. 3 shows an example of a data structure that represents an Ising model in the information processing unit 200. An Ising model is defined by a problem definition 300 and is composed of an interaction definition part 310 which defines interaction coefficients, and an external magnetic field coefficient part 320 which defines external magnetic field coefficients.

The interaction definition part 310 recognizes a set of an identifier for designating a spin which is a source of an interaction (for example, a unique number is assigned to the spin and that number is recognized as the identifier), an identifier of a spin which is a destination of the interaction, and an interaction coefficient and lists up as many such sets as the number of interactions. This is close to an adjacent list which is a data structure used when handling a graph in a computer.

The external magnetic field coefficient definition part 320 recognizes a set of an identifier for designating a spin, which gives an external magnetic field, and an external magnetic field coefficient and lists up as many such sets as the number of external magnetic field coefficients.

Incidentally, the interaction coefficient between spins which are not defined by the interaction definition part 310, or the external magnetic field coefficient for any spin which is not defined by the external magnetic field coefficient 320 is set as 0. In other words, a default value in a case of the interaction coefficient is 0 that represents no existence of the interaction between the relevant spins; and a default value in a case of the external magnetic field coefficient is 0 that represents no external magnetic field for the relevant spin.

FIG. 4 shows an example of a more specific representation form of the data structure in FIG. 3, particularly, a format (file format) when data are retained in the HDD 260. The data structure in FIG. 3 is represented as a text file in the HDD 260. The format of the text file is a list of an identifier for identifying an interaction or an external magnetic field, an identifier of a spin, and a coefficient as shown as problem data 400 in FIG. 4. The original problem data 265, which define the original problem 110, and the sub-problem data 266-1 to 266-$k$, which define the sub-problems 130-1 to 130-$k$, are represented by the format as shown in the problem data 400 in FIG. 4.

(1-4) Data Structure and Format to Represent Solution

Figure 5:
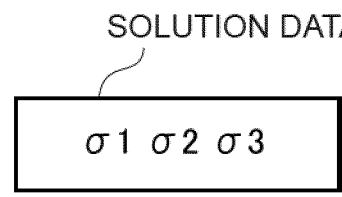
FIG. 5 is a diagram illustrating an example of a data format representing a spin alignment.

FIG. 5 shows an example of a data structure that represents the solution data 268 indicative of the solution 170 and the candidate solution data 267-1 to 267-$k$ indicative of the candidate solutions 150-1 to 150-$k$ in the information processing unit 200 and also shows the format in the HDD 260. Since a solution of an Ising model is a spin alignment, its data structure is a list of sets, each of which includes an identifier of a spin and its spin value, as shown in a solution 500. Then, on the premise that values are written with respect to all spins without any omission, the solution data 268 and the candidate solution data 267-1 to 267-$k$ can be retained in the HDD 260 as a text file in which the identifier of spins is omitted and only the spin values are listed as shown in solution data 550.

(1-5) Description of Sub-Problem Generation

Figure 6:
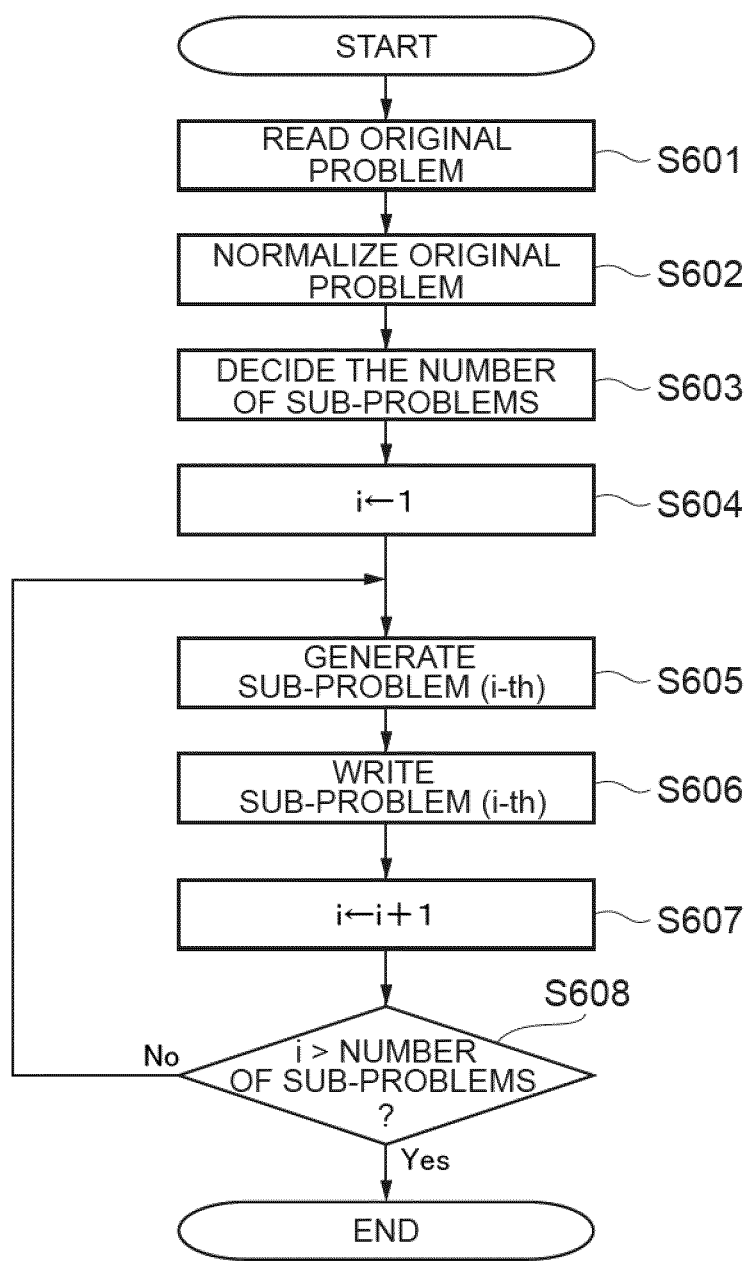
FIG. 6 is a flowchart illustrating an example of an algorithm for generating a sub-problem in a ground-state search of an Ising model according to the present invention.

FIG. 6 shows an example of processing by the sub-problem generation 120 as a flowchart.

In step S601, the original problem data 265 is read from the HDD 260 and expanded into the RAM 220. The interaction coefficients from the i-th spin to the j-th spin in the original problem data 265 will be hereinafter referred to as "$J_{i,j}$ of the original problem" and the external magnetic field coefficient of the i-th spin will be hereinafter referred to as "$h_i$ of the original problem."

In step S602, $J_{i,j}$ of the original problem and $h_i$ of the original problem are normalized. The interaction coefficients and the external magnetic field coefficients of the original problem include various values, but the coefficients are normalized to −1 to +1 by dividing all the coefficients by a coefficient whose absolute value is maximum among both the interaction coefficients and the external magnetic field coefficients (hereinafter referred to as the coefficient depth). Incidentally, the interaction coefficients and the external magnetic field coefficients may be normalized separately. In this case, regarding the interaction coefficients, the interaction coefficient whose absolute value is maximum is defined as the coefficient depth and each interaction coefficient is divided by the coefficient depth and thereby normalized; and regarding the external magnetic field coefficients, the external magnetic field coefficient whose absolute value is maximum is defined as the coefficient depth and each external magnetic field coefficient is divided by the coefficient depth and is thereby normalized.

In step S603, the quantity of sub-problems is determined. There is a trade-off relationship between the quantity of sub-problems and computational complexity and computational precision. Specifically speaking, as the quantity of sub-problems is increased, the possibility of obtaining a solution with higher degree of approximation (close to a global optimal solution) increases; however, it is necessary to perform ground-state searches of many sub-problems, so the computational complexity increases. It is necessary to determine the quantity of sub-problems based on a processing speed of the ground-state search by the information processing unit 200, restricted time caused in terms of applications, and required precision. Generally, the quantity of sub-problems required to find a solution with the same degree of approximation tends to increase in proportion to the size of the problems (the number of spins, the number of interactions, and the number of external magnetic fields) and the coefficient depth found in step S602.

In step S604 to S608, processing for generating sub-problems is executed as many times as the quantity of sub-problems determined in step S603. Firstly in step S604, variable i is set to 1; in step S605, the interaction coefficient and external magnetic field coefficient of a sub-problem for the i-th spin which is the same value as variable i are determined; and in step S606, they are written as the sub-problem data 266-1 to 266-k. Subsequently, step S607, variable i is updated to a value increased by 1; and whether the value of variable i is larger than the number of sub-problems or not is determined in step S608. If the value of variable i is smaller than the number of sub-problems, the processing returns to step S605 and then the processing in steps S605 to S608 is repeated until the value of variable i becomes larger than the number of sub-problems.

Steps S604, S607, and S608 are a loop for executing steps S605 to S606 as many times as the quantity of sub-problems. However, since this loop does not have any dependency on the steps immediately before or after it within that loop, the loop can be easily expanded and executed in parallel in the computer environment where parallel execution is possible. Specifically speaking, if the computer environment with sufficient parallelism exists, the processing of the sub-problem generation 120 can be executed within constant time regardless of the quantity of sub-problems and has scalability even for large-scale problems. The details of step S605 will be explained with reference to another drawing.

Figure 7:
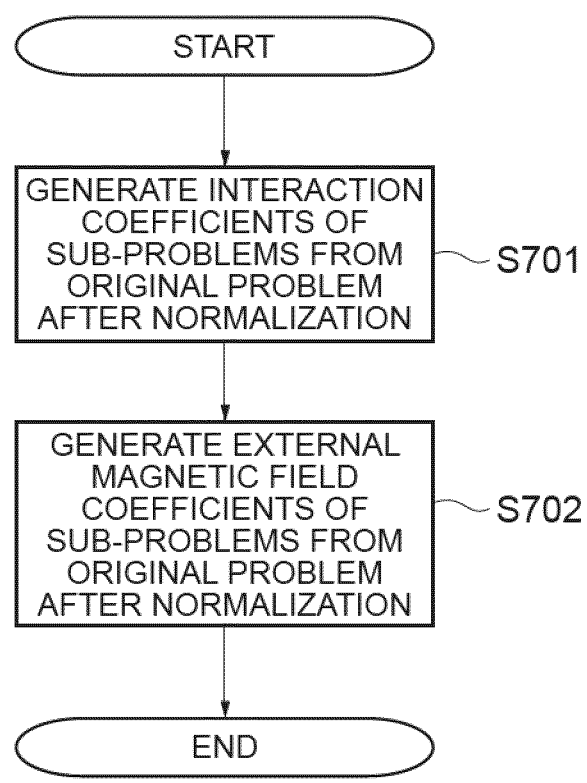
FIG. 7 is a flowchart illustrating an example of an algorithm for generating a sub-problem in a ground-state search of an Ising model according to the present invention.

FIG. 7 shows processing for deciding the interaction coefficients and the external magnetic field coefficients for the sub-problems described above with respect to step S605. The interaction coefficients and the external magnetic field coefficients can be determined by individually independent processing. Therefore, the interaction coefficient (after normalization) of the original problem is input and the interaction coefficient of the sub-problem is determined in step S701 and the external magnetic field coefficient (after normalization) of the original problem is input and the external magnetic field coefficient of the sub-problem is determined in step S702. Since there is no mutual dependency between step S701 and S702, parallel processing is possible. Regarding the processing in step S701 and step S702, there are a plurality of types of algorithms and their details will be described later.

Figure 19:
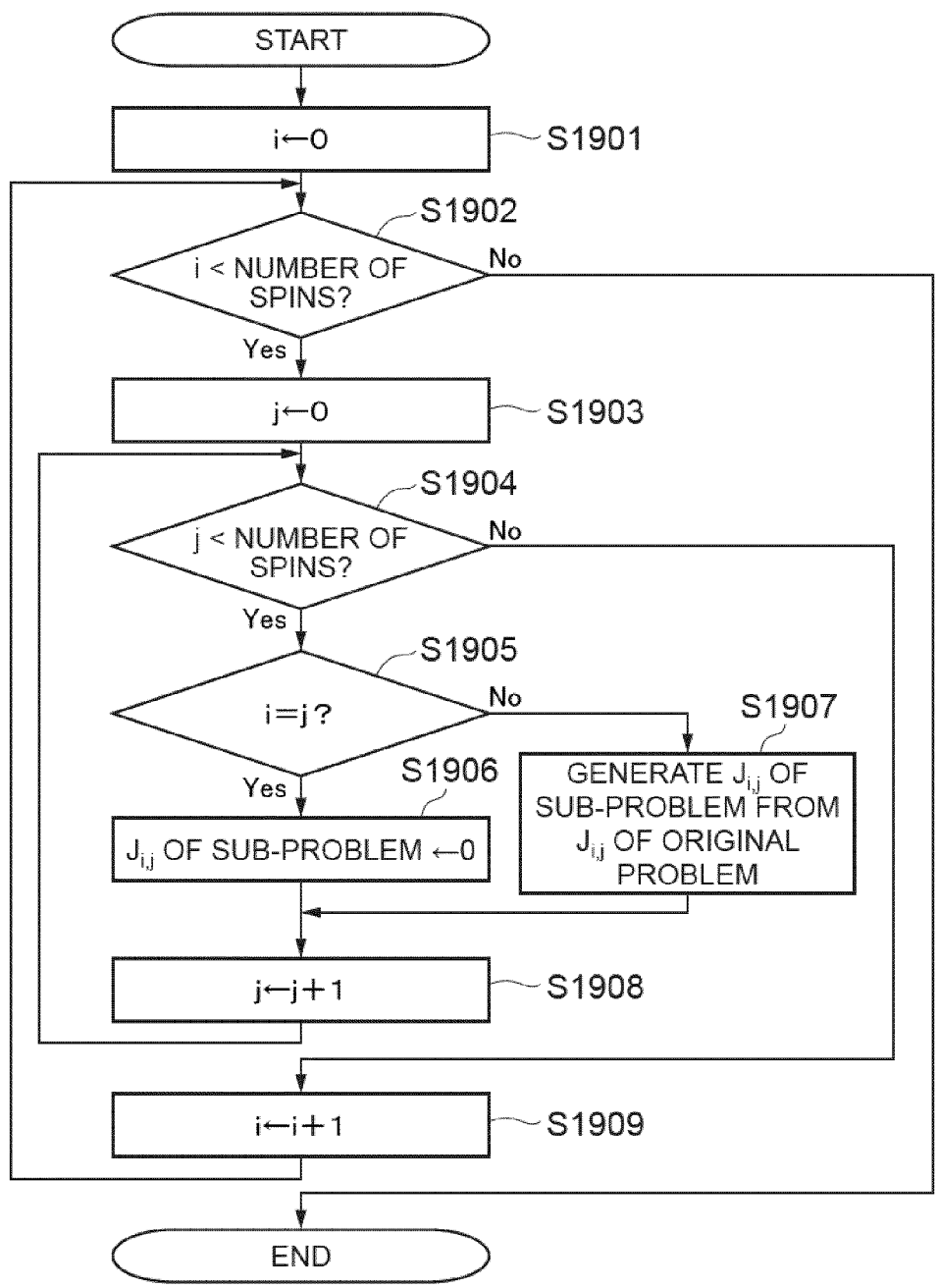
FIG. 19 is a flowchart illustrating an example of an algorithm for generating interaction coefficients of sub-problems in the ground-state search of the Ising model according to the present invention.

(1-6) Processing for Generating Interaction Coefficient of Sub-problem from Interaction Coefficient of Original Problem FIG. 19 shows a flowchart of processing for generating an interaction coefficient of a sub-problem from the interaction coefficient of the original problem after the normalization show in step S701.

In steps S1901 to S1909, a loop for listing up all combinations of two spins of the original problem is repeated. Firstly, in step S1901, variable i corresponding to the i-th spin is initialized (set to 0); and in step S1902, whether the value of variable i is smaller than the total number of spins or not is determined. If the value of variable i is smaller than the total number of spins (S1902: YES), variable j corresponding to the j-th spin is initialized in step S1903 and whether the value of variable j is smaller than the total number of spins or not is determined in step S1904.

If the value of variable j is smaller than the total number of spins (S1905: YES), whether variable i and variable j are the same value or not is determined in step S1905. If variable i and variable j are the same value (S1905: YES), the interaction coefficient $J_{i,j}$ from the i-th spin to the j-th spin of the sub-problem is set to 0 in step S1906; and if variable i and the variable j are not the same value (S1905: NO), the interaction coefficient $J_{i,j}$ of the sub-problem is generated from the interaction coefficient $J_{i,j}$ of the original problem.

Subsequently, the value of variable j is increased by 1 in step S1908 and then the processing in step S1904 and subsequent steps is repeated.

If the value of variable j eventually becomes the same value as the total number of spins (S1904: NO), the value of variable i is increased by 1 in step S1909 and then the processing in step S1902 and subsequent steps is repeated. Furthermore, if the value of variable i becomes the same value as the total number of spins (S1902: NO), this processing is terminated.

Referring to FIG. 19, an outer loop is for variable i and an inner loop is for variable j and each of them is repeated as many times as the number of spins, so that as a result, the innermost loop of step S1905 to S1907 is executed for all combinations of i and j. Incidentally, since there is no dependency between the loops, the loops can be easily expanded and executed in parallel.

When the interaction coefficients $J_{i,j}$ are aligned like a matrix on a two-dimensional plane, these step S1901 to S1909 operate to sequentially scan the matrix from its end. Incidentally, it should be noted that since the variable for the outer loop is i and the variable for the inner loop is j and if certain i and j are given and i>j is satisfied, j and i have already passed (already processed).

The interaction exists only between two mutually different spins. So, as the interaction coefficients are sequentially scanned, there should be no interaction coefficient which satisfies i=j (for example, $J_{1,1}$). Therefore, the interaction coefficient which satisfies i=j in steps S1905 and S1906 as described above is set to 0. Regarding other combinations of i and j, $J_{i,j}$ of the sub-problem is generated from $J_{i,j}$ of the original problem in step S1907

Figure 20:
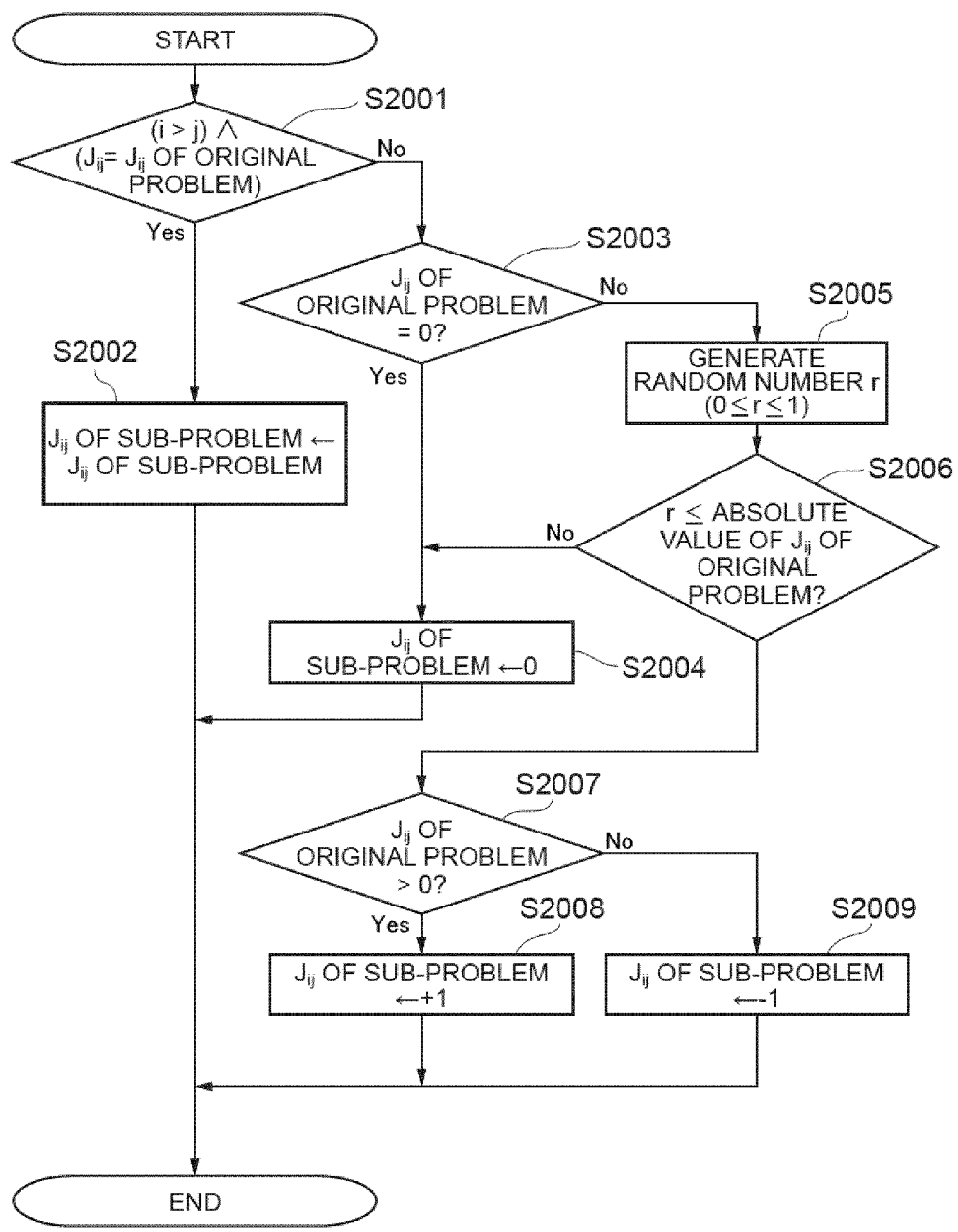
FIG. 20 is a flowchart illustrating an example of an algorithm for generating the interaction coefficients of sub-problems in the ground-state search of the Ising model according to the present invention.
Figure 23:
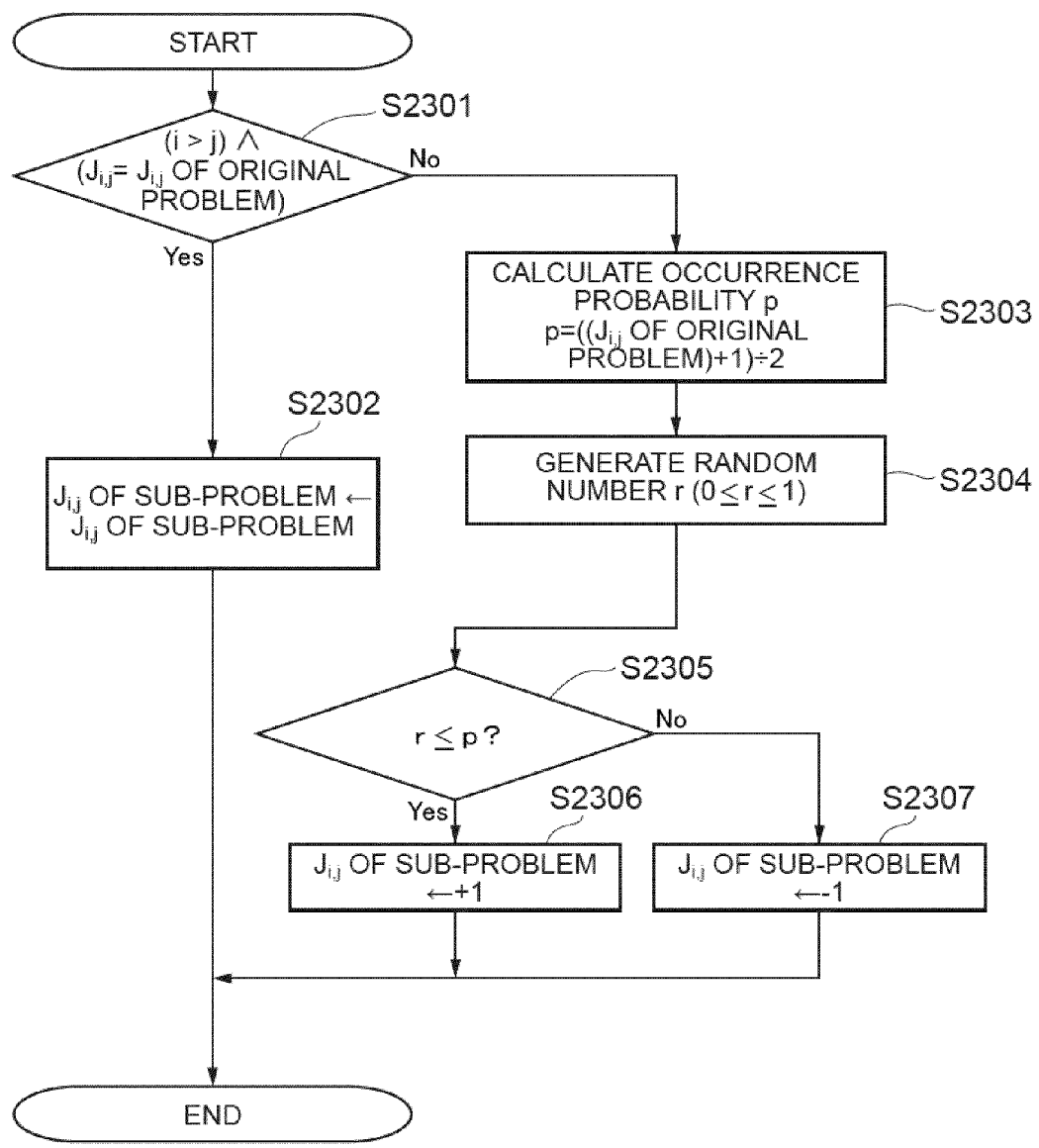
FIG. 23 is a flowchart illustrating an example of an algorithm for generating the interaction coefficients of sub-problems in the ground-state search of the Ising model according to the present invention.

FIG. 20 and FIG. 23 show an example of the processing in step S1907. FIG. 20 and FIG. 23 are two different types of forms of the processing that should be executed in step S1907. In FIG. 20, coefficients of sub-problems are generated to simulate positive coefficients as +1/0 and to simulate negative coefficients as −1/0 among the interaction coefficients of the original problem. In FIG. 23, coefficients of sub-problems are generated to simulate all non-zero interaction coefficients of the original problem as +1/−1.

(1-7) Algorithm to Make Positive Coefficient +1/0 and Negative Coefficient −1/0

Referring to FIG. 20, coefficients of sub-problems are generated to simulate positive coefficients, among the interaction coefficients of the original problem, as +1/0 and simulate negative coefficients as −1/0 in step S1907 (FIG. 19).

In step S2001, whether $J_{i,j}$ of the original problem designated with the given variables i and j is given as a directed graph or as an edge of an undirected graph (undirected edge) is determined. If $J_{i,j}$ of the original problem and $J_{j,i}$ are the same value ($J_{i,j}=J_{j,i}$), it is determined as the undirected edge. Incidentally, in a case of an edge of the directed graph (directed edge), an interaction from the i-th spin to the j-th spin is different from an interaction from the j-th spin to the i-th spin or only either one of them exists, so that $J_{i,j}$ of the original problem and $J_{j,i}$ are different values ($J_{i,j} \neq J_{j,i}$).

In steps S2005 to S2009 of the processing in FIG. 20, +1 or −1 is generated as the coefficient of the sub-problem with probability in proportion to the size of $J_{i,j}$ of the original problem. Since a random number is used under this circumstance, $J_{i,j}$ and $J_{j,i}$ of the sub-problem do not necessarily become the same value. If the original problem is a directed edge and $J_{i,j}$ and $J_{j,i}$ of the original problem are originally different values, it is inevitable that $J_{i,j}$ and $J_{j,i}$ of the sub-problem are different. However, if the original problem is an undirected edge, $J_{i,j}$ and $J_{j,i}$ of the sub-problem should become the save value.

So, if another judgment condition (i>j) in step S2001 is satisfied (S2001: YES), this means that the processing for generating $J_{j,i}$ of the sub-problem from $J_{j,i}$ of the original problem has already been completed (if i>j is satisfied, the combination of j and i has already passed), the value of $J_{j,i}$ of the sub-problem already generated in step S2002 is output as the value of $J_{i,j}$ of the sub-problem.

Next, the processing in steps S2003 to S2009 will be explained below and these steps will be executed if the original problem is not the undirected edge in the judgment of step S2001 or if the original problem is the undirected edge, but it is the first time to generate the coefficient of the sub-problem (S2001: NO).

In step S2003, whether $J_{j,i}$ of the original problem is 0 or not is determined ($J_{i,j}=0$). If $J_{j,i}$ of the original problem is 0, $J_{j,i}$ of the sub-problem is also set to 0 in step S2004.

If $J_{j,i}$ of the original problem is not 0 (S2003: NO), processing in step S2005 to S2009 is executed for outputting, as $J_{j,i}$ of the sub-problem: +1 or 0 if $J_{j,i}$ of the original problem is positive with probability according to the size of the value of $J_{j,i}$ of the original problem; or −1 or 0 if $J_{j,i}$ of the original problem is negative.

Specifically speaking, a random number r having a value range from 0 to 1 is generated in step S2005.

In step S2006, an absolute value of $J_{j,i}$ of the original problem is compared with the random number r generated in step S2005. If the random number r is equal to or less than the absolute value of $J_{j,i}$ of the original problem (r≤the absolute value of $J_{j,i}$ of the original problem) (S2006: YES), whether $J_{j,i}$ of the sub-problem is a positive value or not is determined in step S2007; and if $J_{j,i}$ of the original problem is a positive value (S2007: YES), +1 is output as $J_{j,i}$ of the sub-problem in step S2008; and if $J_{j,i}$ of the original problem is a negative value (S2007: NO), −1 is output as $J_{j,i}$ of the sub-problem in step S2009. Furthermore, if the random number r is not equal to or less than the absolute value of $J_{j,i}$ of the original problem (r≤the absolute value of $J_{j,i}$ of the original problem) (S2006: NO), 0 is output as $J_{j,i}$ of the sub-problem 0 in step S2004. In this way, the coefficient of the sub-problem which is +1/0 or −1/0 is generated with probability in proportion to the size of the coefficient of the original problem.

The above-described algorithm can generate the coefficient of the sub-problem by simulating a positive coefficient, among the coefficients of the original problem, as +1/0 and simulating a negative coefficient as −1/0.

Incidentally, this method can be described as assigning the value of +1/0/−1 to $J_{j,i}$ of the sub-problem so that an expected value or average value of an interaction coefficient ($J_{j,i}$ of the sub-problem) of each edge of the plurality of generated sub-problems becomes a value of $J_{j,i}$ of the normalized original problem.

(1-8) Algorithm to Make Both Positive Coefficient and Negative Coefficient +1/−1

Referring to FIG. 23, the processing of step S1907 for generating the coefficients of the sub-problems to simulate all non-zero interaction coefficients of the original problem as +1/−1 will be described in detail.

Steps S2301 and S2302 are processing for the undirected edge of the original problem and are the same as steps S2001 and S2002 in FIG. 20, so its repeated explanation has been omitted.

Next, processing in steps S2303 to S2007 will be explained and these steps are executed when the original problem is not the undirected edge in the judgment of step S2301 or when the original problem is the undirected edge, but it is the first time to generate the coefficient of the sub-problem.

In step S2303, probability p to generate +1 as the coefficient of the sub-problem is calculated according to the value of $J_{j,i}$ of the original problem. Incidentally, when probability is (p−1), −1 is generated as the coefficient of the sub-problem. Probability p is defined so that the expected value of $J_{j,i}$ of the sub-problem becomes the value of $J_{j,i}$ of the original problem. Specifically, the following expression is used for calculation.

[Math. 4]

$$p=\{(J_{j,i}\text{ of Original Problem})+1\}/2 \qquad (4)$$

Since the value of $J_{j,i}$ of the original problem which is referred to in this expression is a normalized value, it has the range from −1 to +1. If the value of $J_{j,i}$ of the original problem is 0, p becomes 0.5 (p=0.5) and +1 and −1 will be generated at equal probability as the sub-problems. If the value of $J_{j,i}$ of the original problem is +1, p becomes 1 (p=1) and only +1 will be generated as the sub-problems. If the value of $J_{j,i}$ of the original problem is −1, p becomes 0 (p=0) and only −1 will be generated as the sub-problems.

In step S2304, the random number r having a value range from 0 to 1 is generated.

In step S2305, probability p determined in step S2303 is compared with the random number r generated in step S2304. In a case of r≤p, $J_{j,i}$ of the sub-problem is output as +1 in step S2306. If r≤p is not satisfied (that is, in a case of r>p), $J_{j,i}$ of the sub-problem is output as −1 in step S2307.

The above-described algorithm can generate the coefficients of the sub-problems to simulate all the non-zero coefficients, among the coefficients of the original problem, as +1/−1.

Figure 21:
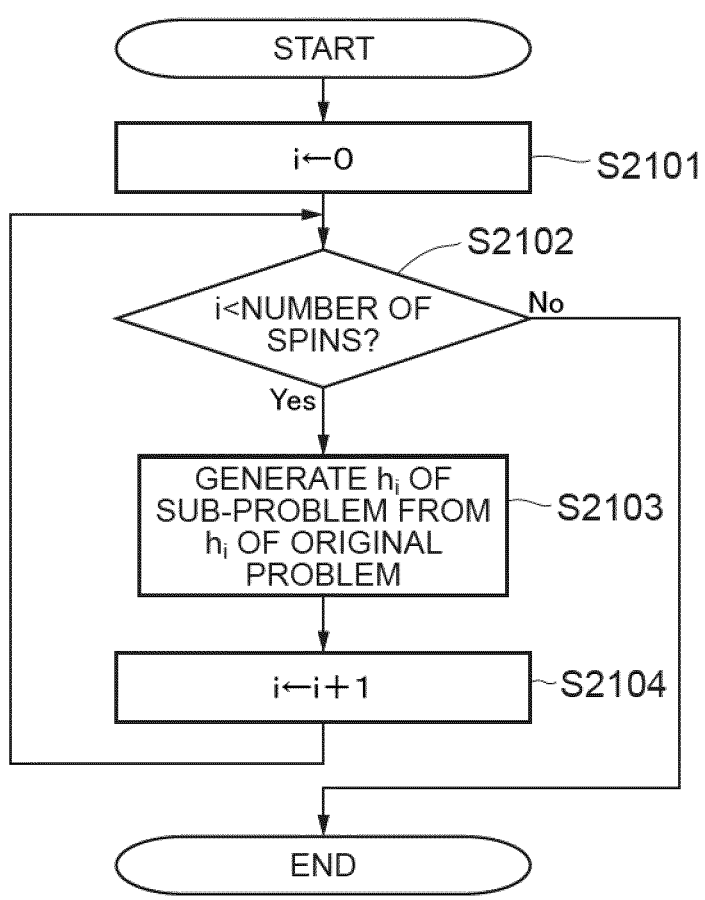
FIG. 21 is a flowchart illustrating an example of an algorithm for generating external magnetic field coefficients of sub-problems in the ground-state search of the Ising model according to the present invention.

(1-9) Processing for Generating External Magnetic Field Coefficient of Sub-Problem from External Magnetic Field Coefficient of Original Problem FIG. 21 shows a flowchart of processing for generating the external magnetic field coefficient of the sub-problem from the external magnetic field coefficient of the original problem after normalization as shown in step S702.

Steps S2101 to S2104 constitute loops for checking all the spins of the original problem (that is, all the external magnetic field coefficients). Incidentally, since there is no dependency between the loops, the loops can be easily expanded and executed in parallel.

In step S2101, variable i indicative of the spin number is set to 0.

In step S2102, whether the value of variable i is smaller than the total number of spins or not is determined; and if the value of variable i is smaller than the total number of spins (S2102: YES), processing is executed for generating $h_i$ of the sub-problem from $h_i$ of the original problem in step S2103.

In step S2104, the value of variable i is updated to a value increased by 1 and the processing in steps S2102 to S2104 is repeated until the value of variable i becomes larger than the total number of spins (S2102: NO).

Figure 22:
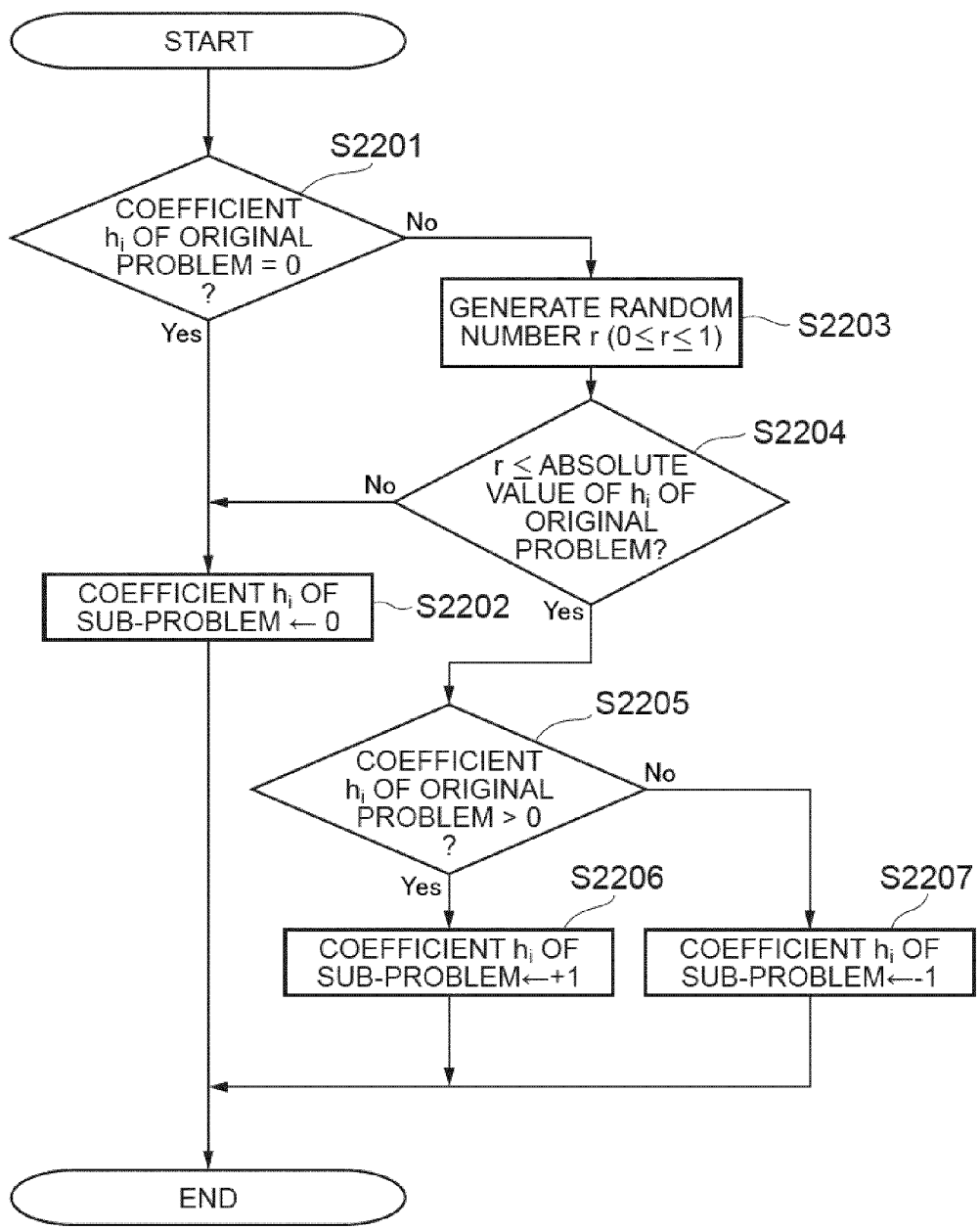
FIG. 22 is a flowchart illustrating an example of an algorithm for generating the external magnetic field coefficients of sub-problems in the ground-state search of the Ising model according to the present invention.
Figure 24:
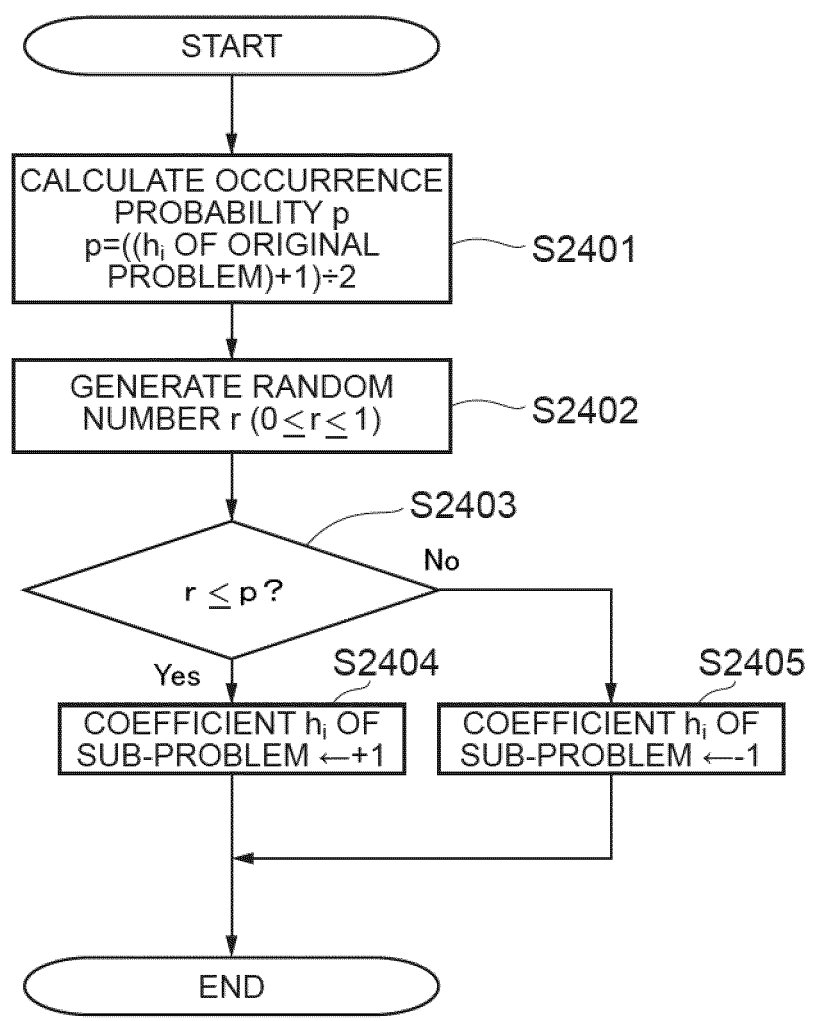
FIG. 24 is a flowchart illustrating an example of an algorithm for generating the external magnetic field coefficients of sub-problems in the ground-state search of the Ising model according to the present invention.

FIG. 22 and FIG. 24 show an example of processing in step S2103. FIG. 22 and FIG. 24 are two different types of forms of the processing that should be executed in step S2103, like the case of the interaction coefficients as shown in FIG. 20 and FIG. 23, and either of them may be used.

In FIG. 22, coefficients of sub-problems are generated to simulate positive coefficients as +1/0 and to simulate negative coefficients as −1/0 among the external magnetic field coefficients of the original problem (this is similar to the processing in FIG. 20 for the interaction coefficients). In FIG. 24, coefficients of sub-problems are generated to simulate all non-zero external magnetic field coefficients of the original problem as +1/−1 (this is similar to the processing in FIG. 23 for the interaction coefficients).

Generally, regarding the method for generating values of the interaction coefficients and the external magnetic field coefficients, the same methods are used collectively. Specifically speaking, the algorithm in FIG. 20 for the interaction coefficients and the algorithm in FIG. 22 for the external magnetic field coefficients are used as a pair and the algorithm in FIG. 23 for the interaction coefficients and the algorithm in FIG. 24 for the external magnetic field coefficients are used as a pair.

(1-10) Algorithm to Make Positive Coefficient +1/0 and Make Negative Coefficient −1/0

The details of the processing in step S2103 for generating external magnetic field coefficients of sub-problems to simulate positive coefficients, among the external magnetic field coefficients of the original problem, as +1/0 and simulate negative coefficients as −1/0 will be explained by using FIG. 22.

In step S2201, whether $h_i$ of the original problem is 0 or not is determined ($h_i$=0). If $h_i$ of the original problem is 0, $h_i$ of the sub-problem is also set to 0 in step S2202.

If $h_i$ of the original problem is not 0, processing in steps S2203 to S2207 is executed for outputting, as $h_i$ of the sub-problem with probability according to the size of the value of $h_i$ of the original problem: +1 or 0 if $h_i$ of the original problem is positive; and −1 or 0 if $h_i$ of the original problem is negative.

In step S2203, the random number r having a value range from 0 to 1 is generated.

In step S2204, an absolute value of $h_i$ of the original problem is compared with the random number r generated in step S2203. If the absolute value of $h_i$ of the original problem is equal to or more than the random number r (r≤the absolute value of $h_i$ of the original problem), $h_i$ of the sub-problem is output as +1 (if $h_i$ of the original problem is a positive value) or as −1 (if $h_i$ of the original problem is a negative value) in step S2205 to S2207. If the absolute value of $h_i$ of the original problem is not equal to or more than the random number r (r≤the absolute value of $h_i$ of the original problem), $h_i$ of the sub-problem is set to 0 in step S2202. In this way, the external magnetic field coefficient of the sub-problem which is +1/0 or −1/0 is generated with probability in proportion to the size of the external magnetic field coefficient of the original problem.

In step S2205, whether $h_i$ of the original problem is positive or negative is determined. If $h_i$ of the original problem is positive, $h_i$ of the sub-problem is output as +1 in step S2206. If $h_i$ of the original problem is negative, $h_i$ of the sub-problem is output as −1 in step S2207.

The above-described algorithm can generate the external magnetic field coefficients of the sub-problems to simulate positive coefficients, among the external magnetic field coefficients of the original problem, as +1/0 and simulate negative coefficients as −1/0.

Incidentally, this method can be described as assigning the value of +1/0/−1 to $h_i$ of the sub-problem so that an expected value or average value of an external magnetic field coefficient ($h_i$ of the sub-problem) of each edge of the plurality of generated sub-problems becomes a value of $h_i$ of the normalized original problem.

(1-11) Algorithm to Make Both Positive Coefficient and Negative Coefficient +1/−1

The details of processing in step S2103 for generating coefficients of sub-problems to simulate all non-zero external magnetic field coefficients of the original problem as +1/−1 will be described by using FIG. 24.

Processing in steps S2401 to S2405 in FIG. 24 can be considered as replacing the interaction coefficient ($J_{j,\,i}$) in steps S2303 to S2307 in FIG. 23 with the external magnetic field coefficient ($h_i$).

In step S2401, probability p to generate +1 as the coefficient of the sub-problem is calculated according to the value of $h_i$ of the original problem. A calculation expression of probability p is as mentioned below and is the same calculation method as in step S2303 in FIG. 23.

[Math. 5]

$$p=\{(h_i \text{ of Original Problem})+1\}/2 \quad (5)$$

In step S2402, the random number r having a value range from 0 to 1 is generated.

In step S2403, probability p determined in step S2401 is compared with the random number r generated in step S2402. If r≤p is satisfied, $h_i$ of the sub-problem is output as +1 in step S2404. If r≤p is not satisfied (if r>p is satisfied), −$h_i$ of the sub-problem is output as −1 in step S2405.

The above-described algorithm can generate the external magnetic field coefficients of the sub-problems to simulate all the non-zero external magnetic field coefficients, among the external magnetic field coefficients of the original problem, as +1/−1.

(1-12) Description of Solution Generation

Figure 8:
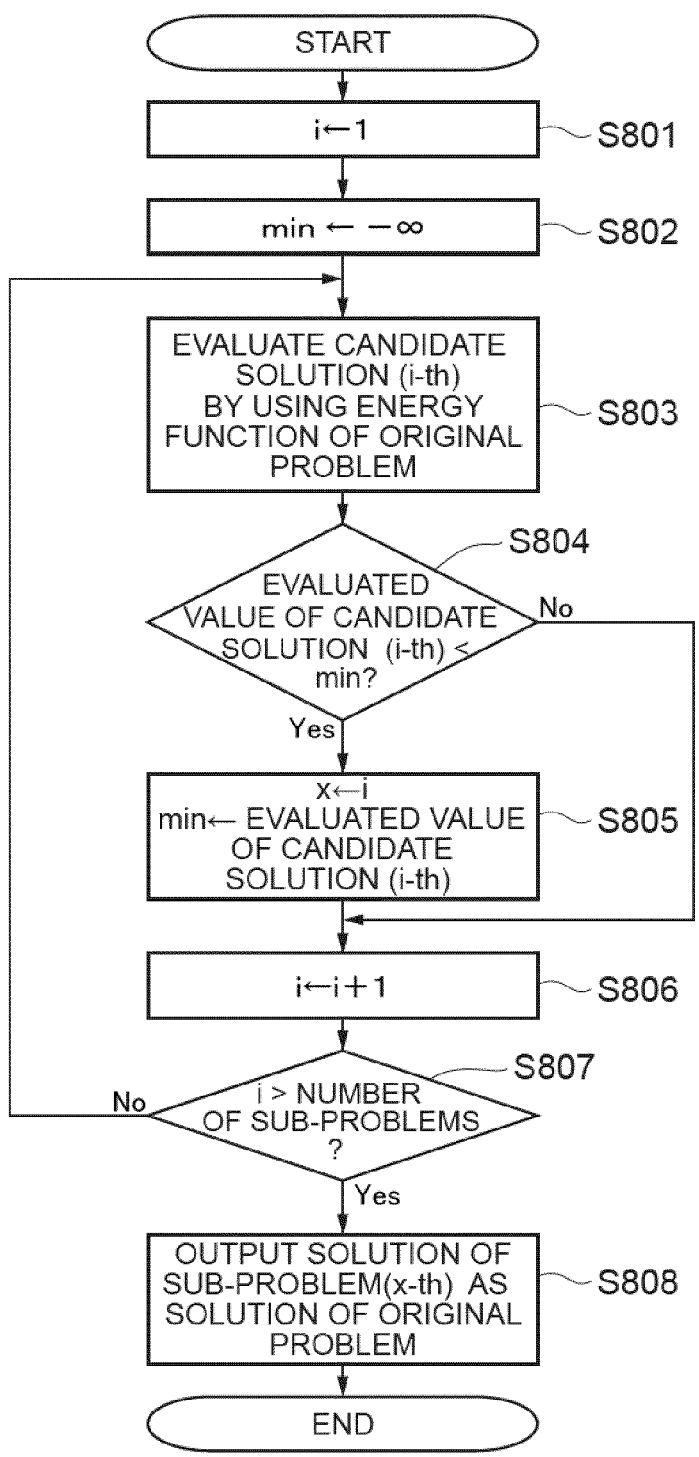
FIG. 8 is a flowchart illustrating an example of an algorithm for generating a solution of an original problem from candidate solutions in the ground-state search of the Ising model according to the present invention.

FIG. 8 shows a flowchart of an example of processing by the solution generation 160. The solution generation 160 in FIG. 8 is to output a solution with the lowest energy of the original problem 110, from among the candidate solutions 150-1 to k, as the solution 170.

In steps S801 to S807, the processing from S803 to S806 is repeated as many times as the quantity of sub-problems. Steps S801, S806, and S807 are loop processing for repetitions.

In step S801, variable i is initialized (that is, variable i is set to 1); and in step S802, variable min for temporarily storing the minimum energy found during the loop is initialized (that is, variable min is set to −∞).

In step S803, one of the one or more candidate solutions is evaluated with the energy function of the original problem; and in step S804, whether the evaluated value (energy) obtained in step S803 is less than variable min or not is determined.

If the evaluated value obtained in step S803 is less than variable min (S804: YES), variable min is updated to the evaluated value obtained in step S803 and variable x indicative of the candidate solution is updated to the value of variable i at that time in step S805.

In step S806, variable i is increased by 1; and whether the value of variable i is larger than the number of sub-problems or not is determined in step S807. If the value of variable i is equal to or less than the number of sub-problems variable i (S807: YES), the processing returns to step S803. After that, the loop from step S803 to S807 is repeated until the value of variable i becomes larger than the number of sub-problems.

As a result of such processing, the minimum energy is eventually set as variable min and the value of variable i corresponding to the candidate solution with such energy is set as variable x. Incidentally, variable x or variable min may have a list structure and a plurality of solutions may be retained.

Incidentally, the processing from step S801 to S807 can be easily executed in parallel on parallel computers by tree-form reduction operation.

Finally, in step S808, the candidate solution stored in variable x is output as the solution 170 of the original problem 110.

(1-13) Example to Solve Specific Problem

An example to solve a specific problem by the above-described ground-state search of the present invention will be described below.

(1-13-1) Maximum Cut Problem of Graph

Figure 9:
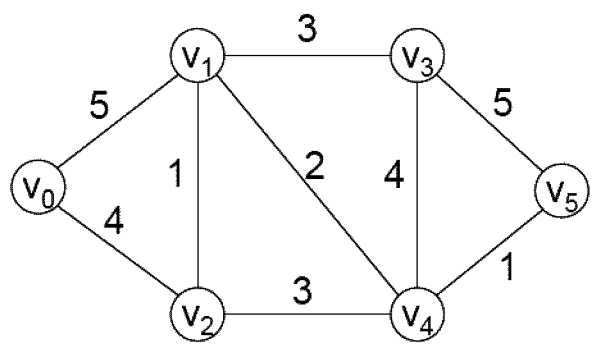
FIG. 9 is an example of a maximum cut problem of a graph.

FIG. 9 shows a maximum cut problem of a graph. A graph G=(V, E) in FIG. 9 is composed of a set of vertexes V={v0, v1, v2, v3, v4, v5} and a set of edges E={e01, e02, e12, e13, e14, e24, e34, e35, e45}. Incidentally, edge e01 means an edge between vertex v0 and vertex v1. Each edge has a weight coefficient as follows: w(e01)=5, w(e02)=4, w(e12)=1, w(e13)=3, w(e14)=2, w(e24)=3, w(e34)=4, w(e35)=5, and w(e45)=1.

Figure 10:
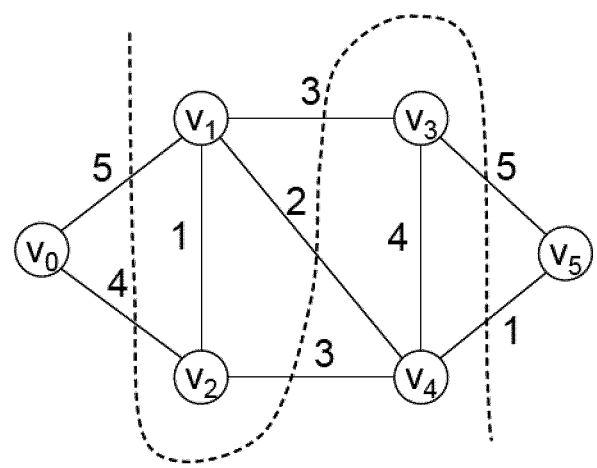
FIG. 10 is an example of a solution of the maximum cut problem of the graph in FIG. 9.

Dividing the vertexes V of this graph into two subsets V' と V'\V as shown in FIG. 10 is called "cut." V'\V represents a set obtained by excluding V' from V. In this example, the edges across the divided V' and V'\V (e01, e02, e13, e14, e24, e35, and e45 in the example of FIG. 10) are called "edges across the cut" or "cut edges." In a case of a graph without weight, the number of cut edges is called the size of the cut; and in a case of a graph with weight like the graph in FIG. 10, a total weight of the cut edge is called the size of the cut. In the example of FIG. 10, the size of the cut is w(V')=23.

Figure 11:
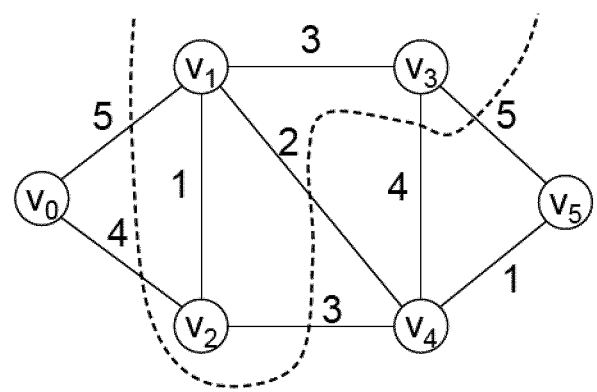
FIG. 11 is an example of a solution of the maximum cut problem of the graph in FIG. 9.

The maximum cut problem is to find a cut to maximize the size of the cut when the graph G=(V, E) is given. In other words, the maximum cut problem may be considered as grouping the vertexes V into V' and V'\V so as to maximize the size of the cut. Incidentally, FIG. 10 shows the maximum cut. Furthermore, this graph has another maximum cut answer having the same cut size by a different cut manner, that is, by a different way of dividing the vertexes V into subsets V' and V'\V, which is shown in FIG. 11. Both FIG. 10 and FIG. 11 are correct answers for the maximum cut problem in FIG. 9.

(1-13-2) Solution of Maximum Cut Problem by Ising Model

Figure 12:
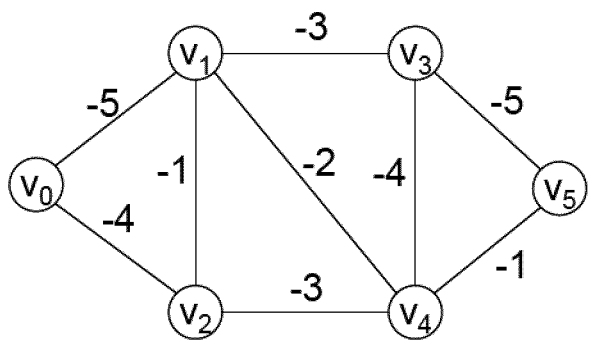
FIG. 12 is an example of an Ising model for obtaining a solution of the maximum cut problem of the graph in FIG. 9.

An explanation will be given by using FIG. 12 to show that the graph of the maximum cut problem in FIG. 9 can be solved by the ground-state search of the Ising model. The Ising model in FIG. 12 is obtained by inverting all signs of the weight coefficients of the edges in the graph of FIG. 9 and using them as interaction coefficients. This Ising model has six spins and each of them has two states, +1 and −1, so that there are 2^6 (64) executable solutions. Regarding energy of these executable solutions, there are 16 types of energy within the range from −36 to 56 as shown in FIG. 12.

There are four types of spin alignments that minimize the energy of the Ising model in FIG. 12, that is, the spin alignments whose ground state becomes the global optimal solution as shown in FIG. 12, and the energy at that time is −36. Incidentally, of the ground states shown in the drawing, each of a combination of (1) and (2) and a combination of (3) and (4) has a relationship of inverted spin values, respectively. When the Ising model has a certain spin alignment and all spin values of that spin alignment are inverted, the energy does not change.

The ground states (1) and (2) in FIG. 12 correspond to the solution of the maximum cut problem in FIG. 11 and the ground states (3) and (4) correspond to the solution of the maximum cut problem in FIG. 10. If the maximum cut problem is recognized as the ground-state search of the Ising model, its solution is to determine spin values to assign different values of vertexes (spins) at end points of the cut edges. The solution may be recognized as setting +1 spin to vertexes belonging to the cut vertex set V' and setting −1 spin to vertexes belonging to V'\V. Furthermore, the values may be reversed as −1 for the vertex set V' and +1 for V'\V. Therefore, it can be understood that the ground-state search of the Ising model corresponds to the maximum cut problem of the graph.

(1-13-3) Example of Solution According to the Present Embodiment

An example in which the ground-state search of the Ising model shown in FIG. 12 is performed by the method and apparatus described in the present embodiment will be explained. The explanation will be given along with the flow of the present invention as illustrated in FIG. 1.

Figure 13:
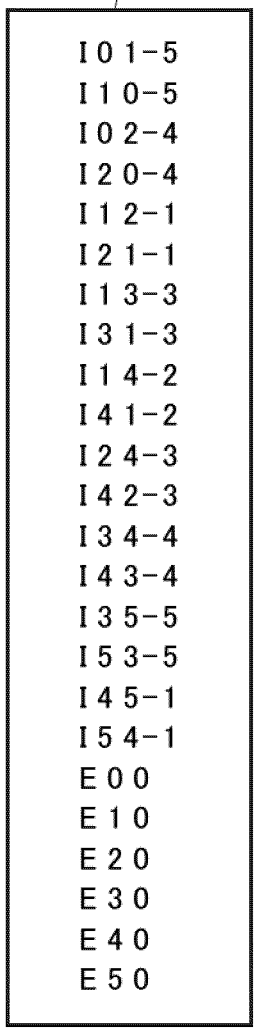
FIG. 13 is an example of data representing the Ising model in FIG. 12.
Figure 33:
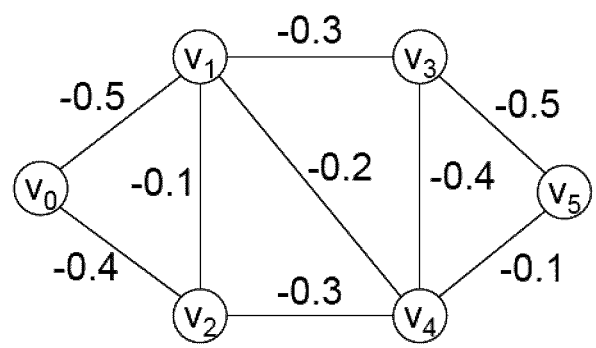
FIG. 33 is an example of an Ising model obtained by normalizing the Ising model in FIG. 12.

Firstly, an original problem is prepared. The original problem data 1300 in FIG. 13 obtained by forming the Ising model in FIG. 12 into data in the format shown in FIG. 4 is used as the original problem. Incidentally, when the Ising model in FIG. 12 is normalized, a model shown in FIG. 33 is obtained. As is apparent from this example, the coefficients of the original problem according to the present invention are not limited to integer numbers and may include real numbers. Although they are the coefficients of the original problem value, they are normalized once and then used. The example of FIG. 33 shows that the values are normalized, for example, within the range from +1 to −1.

Figure 14:
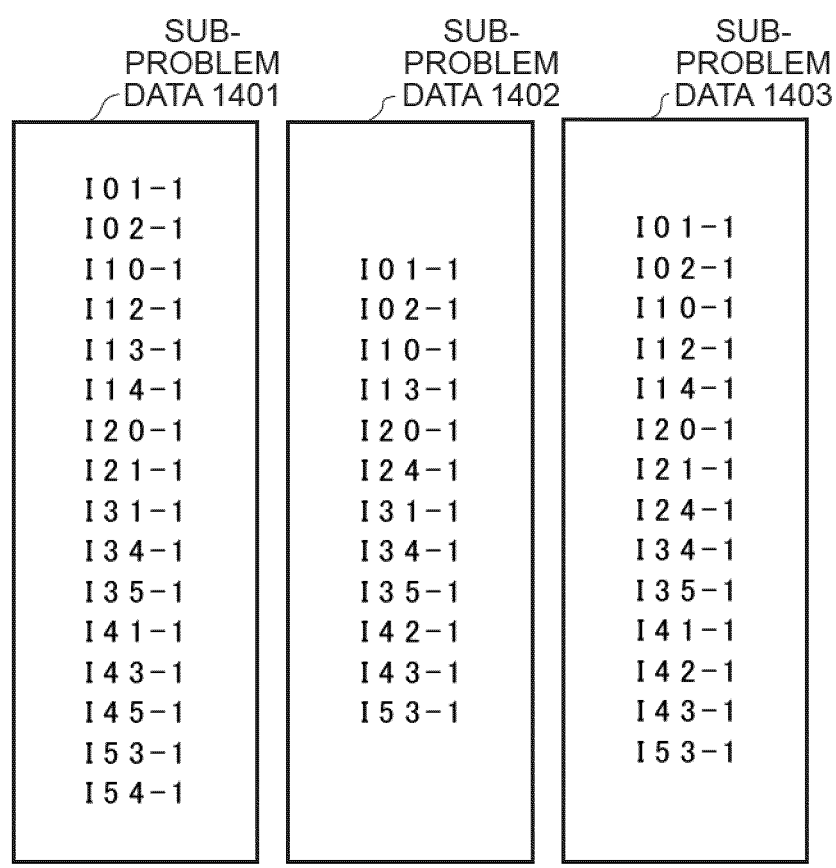
FIG. 14 is an example of data representing sub-problems generated from the original problem in FIG. 12.

Next, the sub-problem generation 120 is applied to the original problem data 1300, thereby generating the sub-problem data 1401 to 1403 in FIG. 14. Incidentally, regarding this sub-problem generation, the algorithm for the interaction coefficients in FIG. 20 and the algorithm for the external magnetic field coefficients in FIG. 22 are used and the coefficients of the sub-problems are generated to simulate positive coefficients, among the interaction coefficients and the external magnetic field coefficients of the original problem, as +1/0 and simulate negative coefficients as −1/0. Incidentally, the number of sub-problems is three in this example due to the paper width of the drawing.

FIG. 15 shows sub-problems 1501 to 1503 drawn as graphs of the sub-problem data 1401 to 1403 to show what kind of models the sub-problem data 1401 to 1403 in FIG. 14 have become as compared to the Ising model of the original problem.

Referring to the sub-problems 1501 to 1503 in FIG. 15, all the edges where interactions exist have turned out to be interactions of the coefficient −1. The Ising model in FIG. 12 includes only negative interaction coefficients. So, if the algorithm in FIG. 20 is applied, the interaction coefficient becomes either −1 or 0; and as the coefficient 0 is considered to be no interaction and is not drawn in the graph, only the edges with the coefficient −1 can be seen.

Then, referring to each edge of the sub-problems 1501 to 1503, the interaction of the coefficient −1 is generated at the edge, regarding which the absolute value of the interaction coefficient of the original problem in FIG. 12 is large (for example, $J_{0,1}=-5$, $J_{0,2}=-4$, $J_{3,4}=-4$, and $J_{3,5}=-5$), at any of the sub-problems 1501 to 1503. On the other hand, it can be confirmed that the smaller the absolute value of the interaction coefficient of the original problem is, the lower the probability of generation of interactions at the sub-problems 1501 to 1503 becomes.

The ground-state search accelerator 270 for the information processing unit 200 performs a limited ground-state search of each of the sub-problems 1501 to 1503 (the sub-problem data 1401 to 1403), thereby obtaining the candidate solution data 1601 to 1603 in FIG. 16.

The candidate solution data 1601 to 1603 in FIG. 16 are in the format shown in FIG. 5 and each piece of the candidate solution data 1601 to 1603 is the ground state of the sub-problem 1501 to 1503. Specifically speaking, for example, the candidate solution data 1601 is a spin alignment that minimizes the energy of the energy function composed of the interaction coefficients and the external magnetic field coefficients of the sub-problem 1501; and the energy at that time is −8. Similarly, the candidate solution data 1602 is a spin alignment that minimizes the energy of the sub-problem 1502; and the energy at the sub-problem 1502 is −8. The candidate solution data 1603 is a spin alignment that minimizes the energy of the sub-problem 1503; and the energy at the sub-problem 1503 is −6.

Finally, the solution data 1701 shown in FIG. 17 is generated from the candidate solution data 1601 to 1603 in the procedures of the solution generation 160 shown in FIG. 8. If the candidate solution data 1601 to 1603 are evaluated with the energy function of the original problem as shown in FIG. 16, the respective evaluation results are −36, −24, and −36. The candidate solution data 1601 and the candidate solution data 1603 with smaller energy among the above-mentioned results (both of them show −36 as the energy of the original problem) are collectively output as the solution data 1701 (incidentally, either the candidate solution data 1601 or the candidate solution data 1603 may be output as the solution data 1701).

Referring to the solution data 1701 in FIG. 17, the first row (the candidate solution data 1601) corresponds to the ground state (4) shown in FIG. 12 and the second row (the candidate solution data 1603) corresponds to the ground state (3) shown in FIG. 12.

Incidentally, if the evaluation of the energy of the original problem with each piece of the candidate solution data 1601 to 1603 during the solution generation as shown in FIG. 8 takes computation time, for example, there is a method of finding a representative value or statistic such as a mode with respect to each spin of the spin alignments of the candidate solution data 1601 to 1603 and using that representative value or statistic as the solution data.

Figure 18:
FIG. 18 is an example of a solution of the original problem obtained from the candidate solution data in FIG. 16.

For example, the spin alignment of the solution data 1801 in FIG. 18 is generated by finding a mode of each spin for the candidate solution data 1601 to 1603. If the solution data 1801 is evaluated with the energy function of the original problem, the energy is −24, which does not reach −36, the energy of the best solution, but is the third best value among the 16 types of energies of the executable solutions. Therefore, we can say that an approximate solution is output.

(1-14) Performance Evaluation of the Present Embodiment

FIG. 26 and FIG. 27 show experimental results of the ground-state search apparatus or method for Ising models which have been explained in the present embodiment.

FIG. 26 shows the experimental results obtained when the algorithm for the interaction coefficients in FIG. 20 and the algorithm for the external magnetic field coefficients in FIG. 22 are used. FIG. 27 shows the experimental results obtained when the algorithm for the interaction coefficients in FIG. 23 and the algorithm for the external magnetic field coefficients in FIG. 24 are used.

The original problem of both FIG. 26 and FIG. 27 is the Ising model in FIG. 12. The sub-problem generation 120 generates 1000 sub-problems from the original problem. Candidate solutions (spin alignments) which can be output as results of the ground-state search are listed for each of 1000 sub-problems.

The spin alignments which can be output as results of the ground-state search are global optimal solutions or local optimal solutions. Generally, a local search method is used, by which some kind of ground-state search means transfers to near a certain spin alignment (for example, another spin alignment with a close Hamming distance) if that transfer can improve the quality of the solution (that is, reduce the energy), or the ground-state search means stay if the transfer cannot improve the quality of the solution. If only this local search method of transferring to the vicinity is used, that would result in a local optimal solution that cannot improve the quality of the solution and it is impossible to reach the global optimal solution. So, a method such as simulation annealing that introduces thermal fluctuations is used; however, it is still difficult to get out of the local optimal solution. Furthermore, even the global optimal solution cannot improve the quality of the solution simply by transferring to the vicinity, so that the global optimal solution can be considered as a type of local optimal solution. The spin alignment output as the result of the ground-state search can be thee local optimal solution in a broad sense including the global optimal solution. When the local optimal solution is output, this means an approximate solution is obtained.

Thus, all possible spin alignments are listed for each of the 1000 sub-problems; whether the relevant spin alignment is a spin alignment which can improve the solution by the aforementioned local search method or not is determined, that is, whether the relevant spin alignment is a global optimal solution or a local optimal solution is determined; and the spin alignments which are global optimal solutions or local optimal solutions are listed as the spin alignment which can be output as a result of the ground-state search of the sub-problems.

As a result, a total of 10332 kinds of solutions in a case of FIG. 26 and a total of 9678 kinds of solutions in a case of FIG. 27 are obtained for the 1000 sub-problems. Accordingly, an average of approximately 10 local optimal solutions exist per sub-problem.

Then, in each case of the 10332 kinds of solutions or the 9678 kinds of solutions, the quality of the solution when the relevant spin alignment is evaluated with the energy function of the relevant sub-problem, that is, what number from the lowest energy the relevant solution is evaluated is indicated in the row direction in the chart. The column direction indicates the quality of the solution when it is evaluated with the energy function of the original problem.

For example, a value at row 1, column 1 in FIG. 26 is 14.0%; and this indicates that 14.0% is the best solution in terms of both the sub-problem and the original problem among the 10332 kinds of solutions which can be obtained for the 1000 sub-problems. A value at row 2, column 1, that is, 16.5% means that it is the second best solution when evaluated with the sub-problem, while it is the best solution for the original problem when it is evaluated with the original problem.

The fourth row with the word "Total" indicates a total value of each column. This row indicated as the total may be considered as showing at how much probability a solution of a specified quality with respect to the original problem can be obtained.

For example, when focusing on the probability of obtaining the best solution for the original problem, such probability is 34.5% in the case of FIG. 26 (the algorithm in FIG. 20 and the algorithm for the external magnetic field coefficients in FIG. 22) and 26.1% in the case of FIG. 27 (the algorithm in FIG. 23 and the algorithm for the external magnetic field coefficients in FIG. 24).

Now, when the best solution for the original problem is to be obtained according to the present invention, how many sub-problems should be enough to be used is found. Specifically speaking, an example of step S603 (decision of the number of sub-problems) in FIG. 6 will be explained.

In the case of FIG. 26, the probability the best solution for the original problem can be obtained is 34.5%. On the other hand, the probability at which other solutions are obtained is 65.5%. The probability at which solutions other than the best solution are obtained consecutively for n times can be calculated as 65.5%×n; and such probability will become a value less than 1% at the eleventh time. Therefore, if 11 sub-problems are generated, the probability of obtaining the best solution for the original problem can be enhanced sufficiently. Furthermore, if the second best solution or solution with lower quality for the original problem, that is, an approximate solution, is permitted to be output, it is possible to further reduce the number of sub-problems.

(1-15) Configuration of Ising Chip and Limitations on Coefficient

The detailed configuration of each Ising chip 280-1, 280-2, which is hardware used as a means for searching the ground state of the Ising model according to the present embodiment, and restrictions on coefficients which are caused due to the configuration of the Ising chip will be described below with reference to FIG. 34 to FIG. 38.

Figure 34:
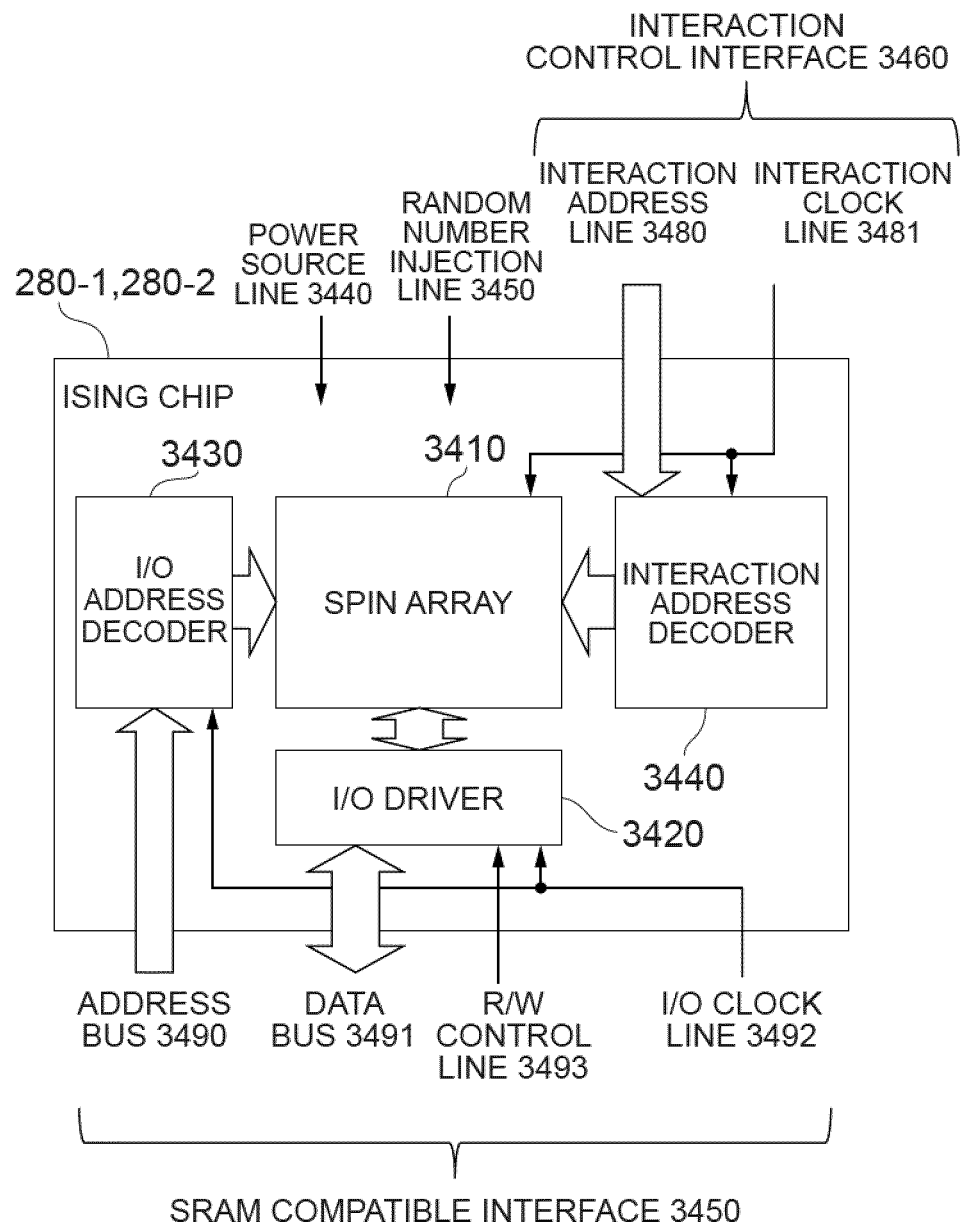
FIG. 34 is a diagram illustrating an example of the configuration of an Ising chip used by the information processing unit in FIG. 2.

FIG. 34 shows an example of a configuration diagram of the Ising chip 280-1, 280-2 according to the present embodiment. The Ising chip 280-1, 280-2 includes a spin array 3410, an I/O (Input/Output) driver 3420, an I/O address decoder 3430, and an interaction address decoder 3440. The present embodiment will be explained by assuming that the Ising chip 280-1, 280-2 is mounted as a CMOS (Complementary Metal-Oxide Semiconductor) integrated circuit which is currently widely known; however, other types of solid-state component are also feasible.

The Ising chip 280-1, 280-2 includes an SRAM compatibility interface 3450 for reading/writing data to/from the spin unit group 3410; and the SRAM compatibility interface 3450 is composed of an address bus 3490, data bus 3491, an R/W control line 3493, and an I/O clock line 3492. Furthermore, the subarray 10 also includes an interaction address line 28 and an interaction clock line 29. Furthermore, the Ising chip 280-1, 280-2 also includes an interaction address line 3480 and an interaction clock line 3481 as an interaction control interface 3460 for controlling the ground-state search of the Ising model. Furthermore, the Ising chip 280-1, 280-2 includes a power source line 3440 to operate the Ising chip 280-1, 280-2 and a random number injection line 3450 to insert a random number to stochastically invert the value of a memory cell which represents a spin of the Ising model as described later.

The Ising chip 280-1, 280-2 expresses all of the spin $\sigma_i$, the interaction coefficient $J_{i,j}$, and the external magnetic field coefficient $h_i$ of the Ising model with information stored in memory cells described later in the spin unit group 10. The SRAM compatibility interface 3450 reads/writes the spin $\sigma_i$ to set an initial state of the spin $\sigma_i$ and read of a solution after completion of the ground-state search. Furthermore, the SRAM compatibility interface 3450 also reads/writes the interaction coefficient $J_{i,j}$ and the external magnetic field coefficient $h_i$ to set the Ising model, whose ground state should be searched, to the Ising chip 280-1, 280-2. Therefore, addresses are assigned to the spin $\sigma_i$, the interaction coefficient $J_{i,j}$, and the external magnetic field coefficient $h_i$ in the spin array 3410.

Furthermore, the Ising chip 280-1, 280-2 realizes interactions between spins within the spin array 3410 in order to perform the ground-state search. The interaction control interface 3460 controls the interactions from outside. Specifically speaking, an address to designate a spin group for performing the interactions is input via the interaction address line 3480 and the interactions are performed in synchronization with clocks input via the interaction clock line 3481.

Regarding the information processing unit 200, the CPU 210 executes the ground-state search accelerator control command 262 to control an Ising chip controller 250 and the Ising chip controller 250 controls the SRAM compatibility interface 3450 and interaction control interface 3460 for the Ising chip 280-1, 280-2, thereby implementing the ground-state search of the Ising model.

Now, a detailed explanation will be given about the fact that coefficients of Ising models which can be handled by the Ising chips 280-1, 280-2 are limited by the configuration of the hardware.

Figure 37:
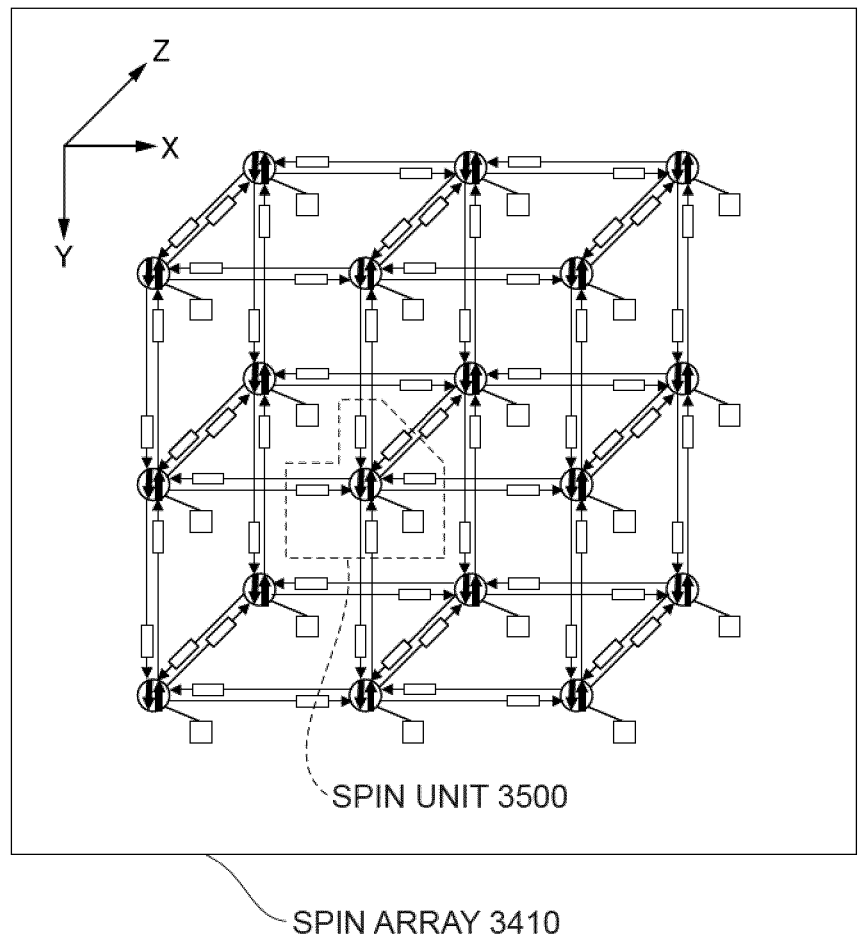
FIG. 37 is a diagram illustrating a form in which a spin array is configured by connecting a plurality of spin units in the Ising chip in FIG. 34.

The spin array 3410 is configured so that numerous spin units 3500 are arranged as basic component units to retain one spin and its associated interaction coefficients and external magnetic field coefficient and implements ground-state search processing. FIG. 37 shows an example in which an Ising model having a three-dimensional lattice topology is configured by arranging a plurality of spin units 3500. The example in FIG. 37 is a three-dimensional lattice of a 3 (X-axis direction)×3 (Y-axis direction)×2 (Z-axis direction) size. Coordinate axes are defined as illustrated in the drawing so that the right direction in the drawing is an X-axis, the downward direction in the drawing is a Y-axis, and the depthwise direction in the drawing is a Z-axis; however, these coordinate axes are defined as necessary merely for the convenience of easy explanation of the embodiment and are irrelevant to the present invention. If a topology other than the three-dimensional lattice such as a tree-shaped topology is used, for example, the number of steps of the tree will be used to represent positions separately from the coordinate axes. If interactions between the spins are interpreted as a graph in the three-dimensional-lattice-shaped topology in FIG. 37, a spin of order 5 at maximum (vertex) will be required. Incidentally, if connection of the external magnetic field coefficient is also taken into consideration, degree 6 at maximum will be required.

Values of adjacent spins (for example, in a case of five adjacent spins $\sigma_j$, $\sigma_k$, $\sigma_l$, $\sigma_m$, $\sigma_n$) are input to one spin unit 3500 shown in FIG. 37. Furthermore, the spin unit 300 also has memory cells to retain, in addition to the spin $\sigma_i$ and the external magnetic field coefficient $h_i$, interaction coefficients $J_{j,i}$, $J_{k,i}$, $J_{l,i}$, $J_{m,i}$, $J_{n,i}$ of the aforementioned adjacent spin $\sigma_i$ (interaction coefficients with the five adjacent spins).

Meanwhile, an Ising model has interactions generally represented by an undirected graph as described earlier. The aforementioned Expression (1) includes $J_{i,j} \times \sigma_i \times \sigma_j$ as a term representing an interaction, which indicates an interaction from the i-th spin to the j-th spin. In this case, a general Ising model does not distinguish between the interaction from the i-th spin to the j-th spin and an interaction from the j-th spin to the i-th spin. In other words, $J_{i,j}$ and $J_{j,i}$ are the same. However, with the Ising chip 280-1, 280-2 according to the present embodiment, this Ising model is extended to a directed graph (Expression (3)) as described earlier and realizes asymmetric interactions, that is, the interaction from the i-th spin to the j-th spin and the interaction from the j-th spin to the i-th spin. As a result, model representation capability enhances, thereby making it possible to represent many problems with small-scale models.

Therefore, if one spin unit 3500 is the i-th spin $\sigma_i$, the interaction coefficients $J_{j,i}, J_{k,i}, J_{l,i}, J_{m,i}, J_{n,i}$ retained by this spin unit 32 determine interactions from the adjacent j-th, k-th, l-th, m-th, and n-th spins $\sigma_j, \sigma_k, \sigma_l, \sigma_m, \sigma_n$ to the i-th spin $\sigma_i$. This corresponds to the fact that arrows (interactions) corresponding to the interaction coefficients included in the spin unit 3500 in FIG. 37 are directed from spins outside the spin unit 3500 shown in the drawing towards spins inside the spin unit 3500.

Figure 35:
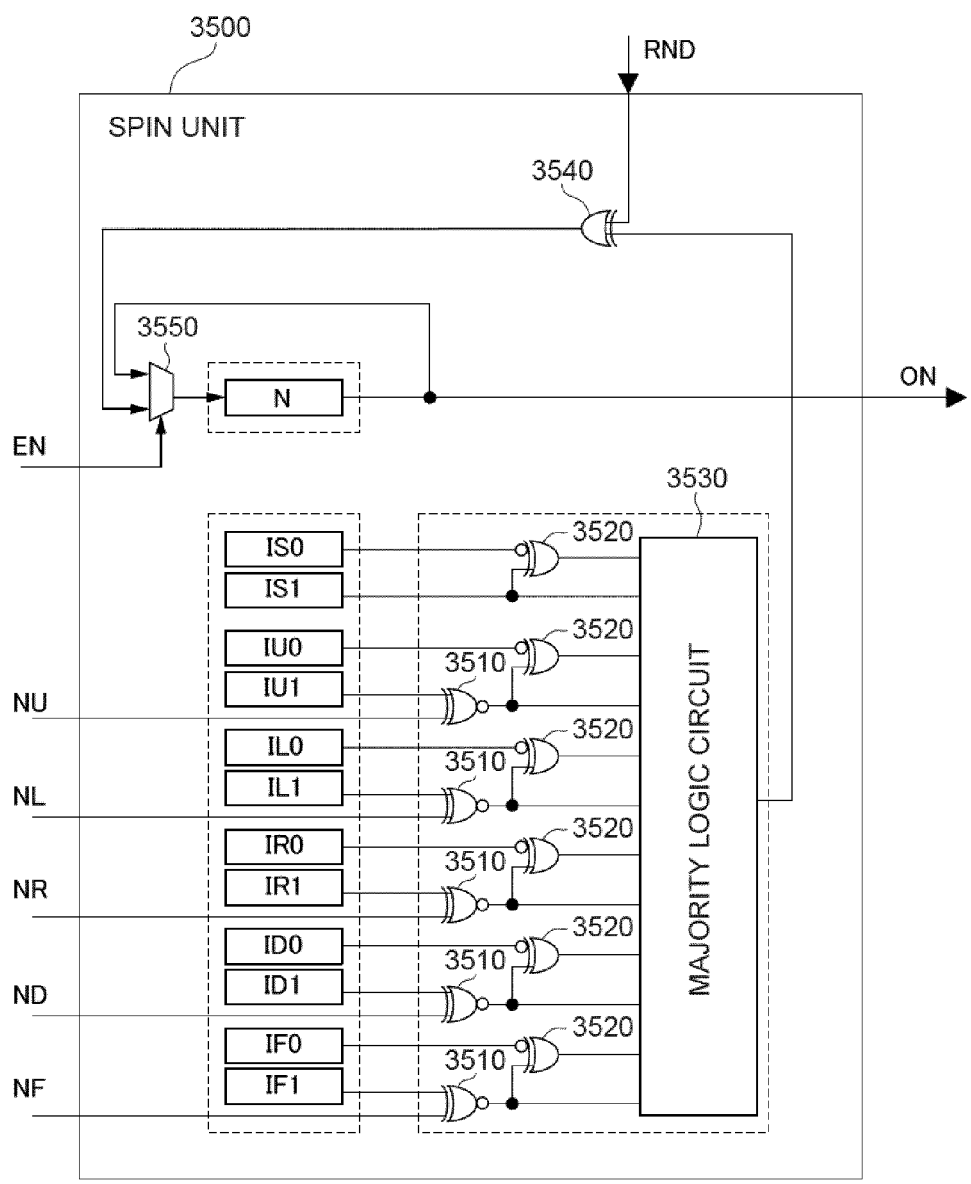
FIG. 35 is a diagram illustrating the configuration of a spin unit constituting the Ising chip in FIG. 34 by focusing on a circuit configuration that performs interactions between spin units.
Figure 36:
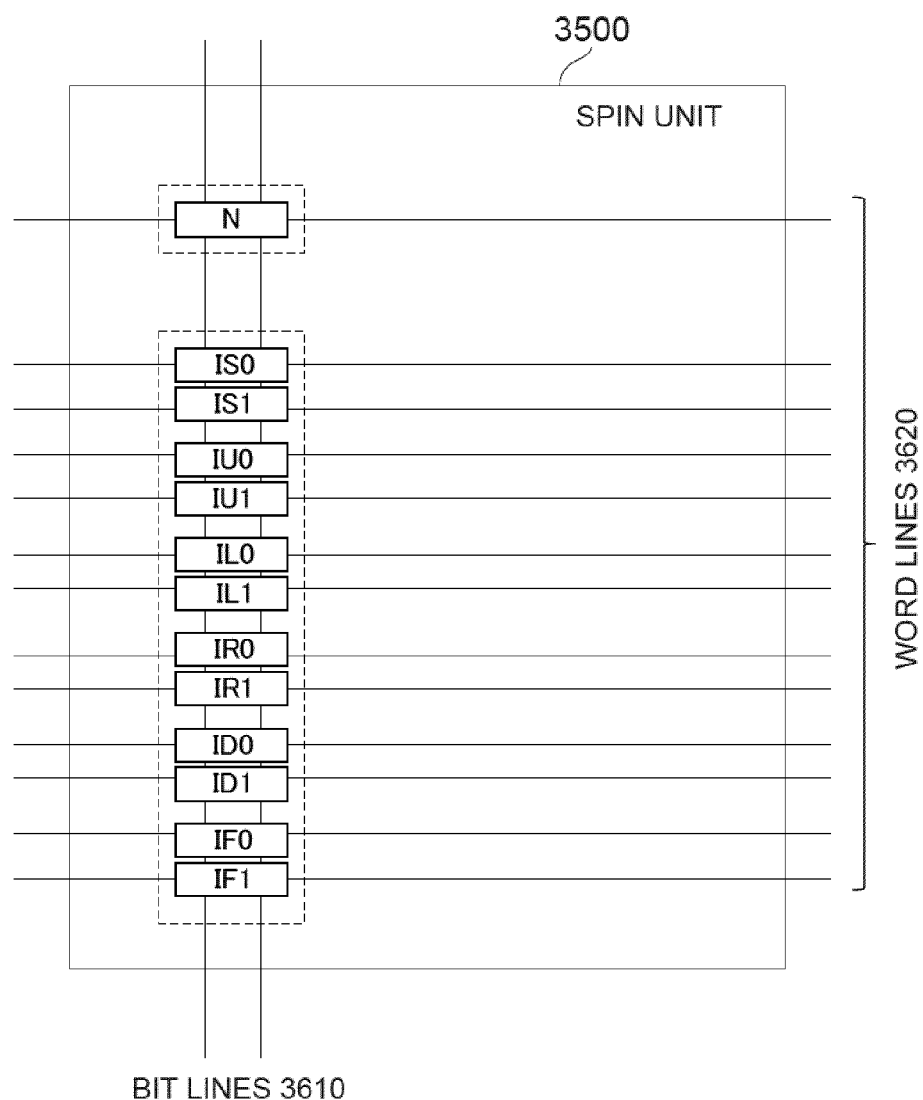
FIG. 36 is a diagram illustrating the configuration of a spin unit constituting the Ising chip in FIG. 34 by focusing on a circuit configuration that reads and writes values of memory cells in a spin unit from outside.

A configuration example of the spin unit 3500 will be described with reference to FIG. 35 and FIG. 36. The spin unit 3500 has two sides, which will be explained separately by using FIG. 35 and FIG. 36 as a matter of convenience; however, one spin unit 3500 includes both configurations of FIG. 35 and FIG. 36. FIG. 35 illustrates a circuit for implementing interactions within the spin unit 3500 and FIG. 36 focuses on the word lines 3620 and the bit lines 3100 which are interfaces for accessing memory cells N, IS0, IS1, IU0, IU1, IL0, IL1, IR0, IR1, ID0, ID1, IF0, IF1 included in the spin unit 3500 from outside the Ising chip 280-1, 280-2.

The spin unit 3500 includes a plurality of 1-bit memory cells N, IS0, IS1, IU0, IU1, IL0, IL1, IR0, IR1, ID0, ID1, IF0, IF1 for retaining the spin $\sigma_i$, the interaction coefficients $J_{j,i}$ to $J_{n,i}$, and the external magnetic field coefficient $h_i$ of the Ising model. Incidentally, two memory cells serve their role as a pair as follows: the memory cells IS0 and IS1, the memory cells IU0 and IU1, the memory cells IL0 and IL1, the memory cells IR0 and IR1, the memory cells ID0 and ID1, and the memory cells IF0 and IF1. So, they will be hereinafter collectively referred to as the memory cell pair ISx, IUx, ILx, IRx, IDx, or IFx (see FIG. 38).

Now, the spin unit 3500 will be described as a spin unit that represents the i-th spin. The memory cell N is a memory cell to represent a spin and retains a spin value. The spin value is +1/−1 (+1 may be expressed as up and −1 may be expressed as down) in the Ising model and this is made to correspond to 0/1 which is a binary value of the memory cell. For example, +1 corresponds to 1 and −1 corresponds to 0.

Figure 38:
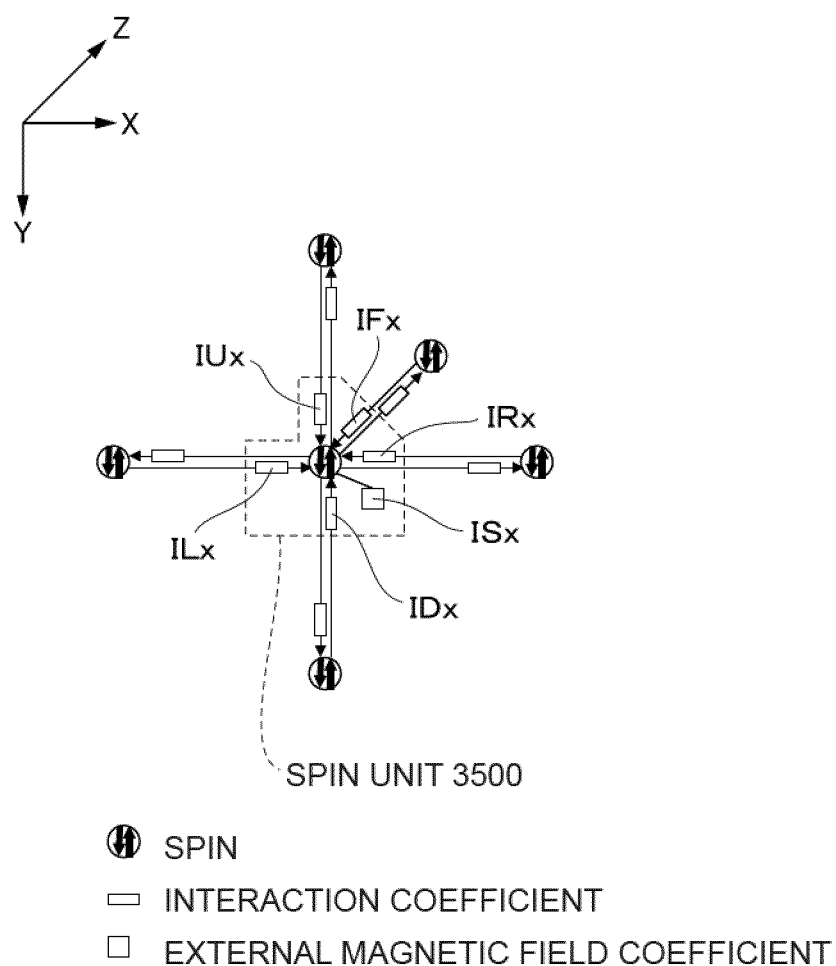
FIG. 38 is a diagram explaining a correspondence relationship between a spin unit and a spin array in the Ising chip in FIG. 34.

FIG. 38 is used to show a correspondence relationship between the memory cell pairs ISx, IUx, ILx, IRx, IDx, and IFx of the spin unit 3500 and the topology of the Ising model shown in FIG. 5. The memory cell pair ISx stores the external magnetic field coefficient. Furthermore, each of the memory cell pairs IUx, ILx, IRx, IDx, and IFx stores an interaction coefficient. Specifically speaking, the memory cell pair IUx stores an interaction coefficient with an upper-side spin (−1 in the Y-axis direction); the memory cell pair ILx stores an interaction coefficient with a left-side spin (−1 in the X-axis direction); the memory cell pair IRx stores an interaction coefficient with a right-side spin (+1 in the X-axis direction); the memory cell pair IDx stores an interaction coefficient with a down-side spin (+1 in the Y-axis direction); and the memory cell pair IFx stores an interaction coefficient $J_{i,j}$ with a spin connected in a depthwise direction (+1 or −1 in the Z-axis direction).

Furthermore, if the Ising model is recognized as a directed graph and is seen from a certain spin, other spins have coefficients that influence the relevant spin. The coefficients by which the relevant spin influence the other spins belong to the respective other spins. Specifically speaking, this spin unit 3500 is connected to five spins at maximum. With the Ising chip 100 according to the present embodiment, the external magnetic field coefficient and the interaction coefficients correspond to three values, +1/0/−1. Therefore, a 2-bit memory cell is required to represent each of the external magnetic field coefficient and the interaction coefficients. The memory cell pairs ISx, IUx, ILx, IRx, IDx, and IFx represent the three values +1/0/−1 by using a combination of two memory cells whose number at the end of their reference signs is 0 or 1 (for example, in a case of the memory cell pair ISx, the memory cells IS0 and IS1). For example, in the case of the memory cell pair ISx, the memory cell IS1 represents +1/−1; and when a value retained by the memory cell IS1 is 1, it represents +1; and when the value retained by the memory cell IS1 is 0, it represents −1. In addition, when the value retained by the memory cell IS0 is 0, the external magnetic field coefficient is recognized as 0; and the value retained by the memory cell IS0 is 1, either of +1/−1 determined by the value retained by the memory cell IS1 is recognized as the external magnetic field coefficient. When the external magnetic field coefficient is 0 and if it is assumed that the external magnetic field coefficient is disabled, you can say that the value retained by the memory cell IS0 is an enable bit of the external magnetic field coefficient (the external magnetic field coefficient is enabled when IS0 is 1). Similarly, the memory cell pairs IUx, ILx, IRx, IDx, and IFx which store the interaction coefficients have the coefficients and the bit values correspond to each other.

Each of the memory cells N, IS0, IS1, IU0, IU1, IL0, IL1, IR0, IR1, ID0, ID1, IF0, and IF1 in the spin unit 3500 must be designed so that data can be read from or written to it from outside the Ising chip 280-1, 280-2. Therefore, each spin unit 3500 has the word lines 3610 and the bit lines 3620 as shown in FIG. 36. The memory cells in the spin unit 3500 can be read or written by the SRAM compatibility interface 3450 for the Ising chip 280-1, 280-2 in the same manner as a general SRAM (Static Random Access Memory) by arranging the spin units 3500 in a tile-like manner on a semiconductor substrate, connecting the bit lines 3610 and the word lines 3620, and using the I/O address decoder 3430 and the I/O driver 3420 for driving, controlling, or reading.

Since the spin units 3500 are updated at the same time, each spin unit 3500 independently has a circuit for deciding the state of the next spin by calculating interactions. FIG. 35 shows a circuit for deciding the next state of the spin. Referring to FIG. 35, the spin unit 3500 has signal lines EN, NU, NL, NR, ND, NF, ON, and GND as interfaces with outside the spin unit 3500. The signal line EN is an interface for inputting a switching signal which permits updates of spins of the relevant spin unit 3500. By controlling a selector 3550 using this switching signal, the spin value retained by the memory cell N can be updated to a value given from a majority logic circuit 3530 described later via an OR circuit 3540 to the selector 3550.

The signal line ON is an interface for outputting the spin value retained by the relevant spin unit 3500 to other spin units 3500 (adjacent units in the topology in FIG. 37). Each of the signal lines NU, NL, NR, ND, and NF is an interface for inputting a spin value retained by each of the other spin units 3500 (the adjacent units in the topology in FIG. 37). The signal line NU receives input from the upper-side spin (−1 in the Y-axis direction); the signal line NL receives input from the left-side spin (−1 in the X-axis direction); the signal line NR receives input from the right-side spin (+1 in the X-axis direction); the signal line ND receives input from the down-side spin (+1 in the Y-axis direction); and the signal line NF receives input from the spin connected in the depthwise direction (+1 or −1 in the Z-axis direction).

Incidentally, in consideration of the topology of the Ising model, it is necessary to how to treat its terminals. If the ends are simply cut off as illustrated in the topology in FIG. 37, no input to the signal lines NU, NL, NR, ND, and NF may be required with respect to the terminals (appropriate processing is executed as an unused input terminal by, for example, connecting to a fixed value of 0 or 1 in terms of the circuit).

Regarding the spin unit 3500, the next state of the relevant spin is determined so as to minimize energy between the adjacent spins. This is equivalent to judging either one of a positive value and a negative value is controlling with respect to a product of the adjacent spins and the interaction coefficients and the external magnetic field coefficient. For example, assuming that the spins $\sigma_j$, $\sigma_k$, $\sigma_l$, $\sigma_m$, and $\sigma_n$ are adjacent to the i-th spin $\sigma_i$, the next state of the spin $\sigma_i$ is determined as described below. Firstly, it is assumed that values of the adjacent spins are $\sigma_j=+1$, $\sigma_k=-1$, $\sigma_l=+1$, $\sigma_m=-1$, and $\sigma_n=+1$, the interaction coefficients are $J_{j,\ i}=+1$, $J_{k,\ i}=+1$, $J_{l,\ i}=+1$, $J_{m,\ i}=-1$, and $J_{n,\ i}=-1$, and the external magnetic field coefficient is $h_i=+1$. Products of the interaction coefficients and the adjacent spins and the external magnetic field coefficient under this circumstance are as follows: $\sigma_j \times J_{j,\ i}=+1$, $\sigma_k \times J_{k,\ i}=-1$, $\sigma_l \times J_{l,\ i}=+1$, $\sigma_m \times J_{m,\ i}=+1$, $\sigma_n \times J_{n,\ i}=-1$, and $h_i=+1$. The external magnetic field coefficient may be considered as an interaction coefficient with a spin whose value is always +1.

Now, local energy between the i-th spin and the adjacent spins is obtained by multiplying each of the aforementioned coefficients by the i-th spin value and further inverting the sign. For example, the local energy with the j-th spin becomes: −1 when the i-th spin is +1; and +1 when the i-th spin is −1. So, the spins work in a direction to reduce the local energy under this circumstance when the i-th spin is +1. When thinking about the local energy with respect to the external magnetic field coefficient between all the adjacent spins, the calculation is performed to find out which value of the i-th spin, either +1 or −1, can reduce the energy. This may be done simply by counting the number of the values +1 and −1 to see which is larger the number of +1 or the number of −1 when the aforementioned products of the interaction coefficients and the adjacent spins and the external magnetic field coefficient are listed. In the aforementioned example, there are four +1 and two −1. If the i-th spin is +1, a sum of energy will be −2; and if the i-th spin is −1, the sum of energy will be +2. Therefore, the next state of the i-th spin to minimize the energy can be determined by a majority of the spin values, that is, by deciding the next state of the i-th spin as +1 when the number of +1 is larger, and as −1 when the number of −1 is larger.

The logical circuit shown in the spin unit 3500 in FIG. 35 is a circuit for performing the above-described interactions. Firstly, an XNOR circuit 3510 is used to find an exclusive NOR (XNOR) of the state of the adjacent spins and the values retained by the memory cells IU1, IL1, IR1, ID1, IF1 which indicate the interaction coefficients +1/−1. Accordingly, the next state of the relevant spin to minimize the energy can be calculated merely by considering its interactions (it is assumed that +1 is encoded as 1 and −1 is encoded as 0). If the interaction coefficients are only +1/−1, the next state of the relevant spin can be determined by a majority logic, that is, by having a majority logic circuit 3530 determine which is larger the number of +1 or the number of −1 among outputs from the XNOR circuit 3510. Regarding the external magnetic field coefficient, assuming that it corresponds to an interaction coefficient with a spin whose state is always +1, simply the value of the external magnetic field coefficient becomes a value that should be input to the majority logic circuit 3530 which determines the next state of the spin.

Next, a method of realizing the coefficient 0 will be discussed. When there is a majority logic f with n input (I1, I2, I3, and so on up to In), the following proposition can be recognized as true. Firstly, it is assumed that there are duplicates I'1, I'2, I'3, and so on up to I'n of inputs I1, I2, I3, and so on up to In (Ik=I'k for arbitrary k). Under this circumstance, output from f (I1, I2, I3, and so on up to In) is equivalent to that of f to which the duplicates are also input (I1, I2, I3, and so on up to In and I'1, I'2, I'3, and so on up to I'n). In other words, even if two values are input as each input variable, the output will be invariant. Furthermore, it is assumed that, besides the inputs I1, I2, I3, and so on up to In, another input Ix and its inverted value !Ix exist. Under this circumstance, output from f (I1, I2, I3, and so on up to In, Ix, !Ix) is equivalent to that of f (I1, I2, I3, and so on up to In). Specifically speaking, when the input variables and their inverted values are input, the function works to cancel influences of the input variables by a majority. The coefficient 0 is realized by making use of this property of the majority logic. Specifically speaking, as shown in FIG. 35, a duplicate of a candidate value of the next state of the relevant spin as mentioned above or its inverted value is simultaneously input to the majority logic circuit 3530, depending on a value of the bit which determines enabling of the coefficient (the bit retained in each of the bit cells IS0, IU0, IL0, IR0, ID0, and IF0), by using the XOR circuit 3520. For example, if a value of the bit retained by the memory cell IS0 is 0, the value of the bit retained in the memory cell IS1 and a value obtained by inverting the value of the bit retained by the memory cell IS1 are simultaneously input to the majority logic circuit 3530. So, there will be no influence of the external magnetic field coefficient (the external magnetic field coefficient corresponds to 0). Furthermore, if the value of the bit retained by the memory cell IS0 is 1, the value of the bit retained by the memory cell IS1 and the same value (duplicate) as the above value are input simultaneously to the majority logic circuit 3530.

The ground-state search of the applied Ising model can be realized by energy minimization by means of interactions between the aforementioned spins, but performing only the ground-state search might result in a local optimal solution. Basically, there are only movements in a direction to reduce the energy. So, once the calculation results in the local optimal solution, it is impossible to get out of it and reach a global optimal solution. Accordingly, since the value of the memory cell, which represents spins, is stochastically inverted as an action to escape from the local optimal solution, the spin unit 3500 includes an RND interface. The spin value can be stochastically inverted by inserting a random bit string via the random number injection line 3450 from outside the Ising chips 280-1 and 280-2 and inputting it to the OR circuit 3540 via the RND interface of the spin unit 3500.

The above-described configuration can provide the Ising chip 280-1, 280-2 which realizes the ground-state search of the three-dimensional lattice Ising model having the three types +1/0/−1 of interaction coefficients and the external magnetic field coefficient. Then, it is understood that the above-mentioned limitation on the coefficients, that is, the "three types +1/0/−1" is attributable to the memory cells ISx, IUx, ILx, IRx, IDx, and IFx to retain the coefficients and the structure of the majority logic that determines the spin value to reduce to the energy from the coefficients and the adjacent spin values.

If the detailed circuit designing and layout are performed to actually manufacture the Ising chips 280-1 and 280-2, most of the chip area is occupied by the spin array 3410. Then, as the area of the spin array 3410 is proportionate to the area obtained by multiplying the area of the spin unit 3500 by the number of spins, whether the area of the spin unit 3500 is large or small influences scalability of the Ising chips 280-1, 280-2 significantly. Generally, it can be said that the cost required for manufacturing of semiconductor integrated circuits is determined by process generation (fineness), chip area, and quantity production amount. The smaller the area of the spin unit 3500 is with the same process generation and quantity production amount, the more the cost can be reduced. Furthermore, the larger the chip area is, the larger the degree of yield reduction due to manufacturing defects becomes. So, it is desirable to reduce the area of the spin unit 3500 in terms of realization of a larger number of spins.

By limiting the coefficients to the "three types +1/0/−1," the above-described configuration can set 2 bits per one coefficient to a memory cell for maintaining the coefficient (12 bits in total) and realize a circuit for calculating the interactions only using eleven exclusive-OR circuits (five XNOR circuits 3510 and six XOR circuits 3520) and the majority logic circuit 3530. As a result, this contributes to a reduction of the area of the spin unit 3500. As is apparent from the configuration in FIG. 35, you can see that the area of the spin unit 3500 is controlled by the constituent elements required for interactions (the memory cell pairs ISx, IUx, ILx, IRx, IDx, and IFx, the XNOR circuit 3510, the XOR circuit 3520, and the majority logic circuit 3530), rather than the constituent element to retain the spin value (the memory cell N). Therefore, it is understood that it is important to simplify the circuit related to the interactions in order to enhance scalability.

Now, an attempt is made to expand the hardware in order to realize arbitrary coefficients. Generally, 32-bit or 64-bit integer values or floating point numbers are often used in order to represent coefficients of Ising models on conventional computers. If they are to be directly implemented in the hardware, just a memory cell for retaining the coefficient would require 32 bits to 64 bits (192 to 384 bits in total) per coefficient. This will increase the physical mount 16 times to 32 times that of the above-mentioned implementation. In other words, scalability will worsen to 1/16 to 1/32. Furthermore, regarding the circuit for calculating the interactions, the circuit is simplified by utilizing the limitation on the coefficients in the aforementioned example, but general-purpose adders, multipliers, and comparators are required. It is easily imaginable that the influence by an increase of the physical amount by such functional units will become larger than an increased amount of the memory cells. Therefore, the physical amount as a whole will increase more than 16 times to 32 times.

In consideration of the above point as well, it can be understood that it is not wise to try solving the Ising model of an arbitrary coefficient by using only the hardware. So, as described in the present embodiment, it is necessary to solve the Ising model of the arbitrary coefficient by contriving how to use the hardware with limited coefficients.

(1-16) Advantageous Effects of the Present Embodiment

The present embodiment is designed as described above with reference to FIG. 1 so that a plurality of sub-problems 130-1 to 130-$k$ composed of the interaction coefficient $J_{i,j}$ and the external magnetic field coefficient $h_i$ which can be accepted by the limited ground-state searches 140-1 to 140-$k$ are generated from the original problem 110; and solutions of these sub-problems 130-1 to 130-$k$ are used as candidate solutions 150-1 to 150-$k$ to generate a solution of the original problem 110 based on these candidate solutions 150-1 to 150-$k$. So, even when the types of the coefficient values of the Ising models whose ground state can be searched are limited by restrictions on hardware or software, it is possible to find the solution of the original problem 110 of an Ising model composed of coefficients other than the above-mentioned types. Therefore, according to the present embodiment, the ground-state search of the Ising model having coefficients of arbitrary values can be performed regardless of the restrictions on the hardware or the software.

(2) Second Embodiment

In the present embodiment, an explanation will be given about another example of an apparatus and method for implementing the ground-state search of the Ising model having coefficients of arbitrary values by using the apparatus and method for performing the ground-state search of the Ising model with the limited types of coefficient values.

In the present embodiment, the sub-problem generation 120 and the solution generation 160 are different from those in the first embodiment, so differences from the first embodiment will be explained.

In the first embodiment, the sub-problem generation 120 uses the random numbers (steps S2005, S2203, S2304, and S2402). However, generation of the random numbers may impose a heavy load in the environment where computer resources such as embedded systems are poor. Particularly, since as many random numbers as the quantity of the interaction coefficients and the external magnetic field coefficient need to be generated according to the present invention, the number of times of generation of the random numbers increases in proportion to the size of the original problem and the quantity of sub-problems.

Therefore, in the present embodiment, the sub-problem generation 120 is performed without using the random numbers.

Figure 28:
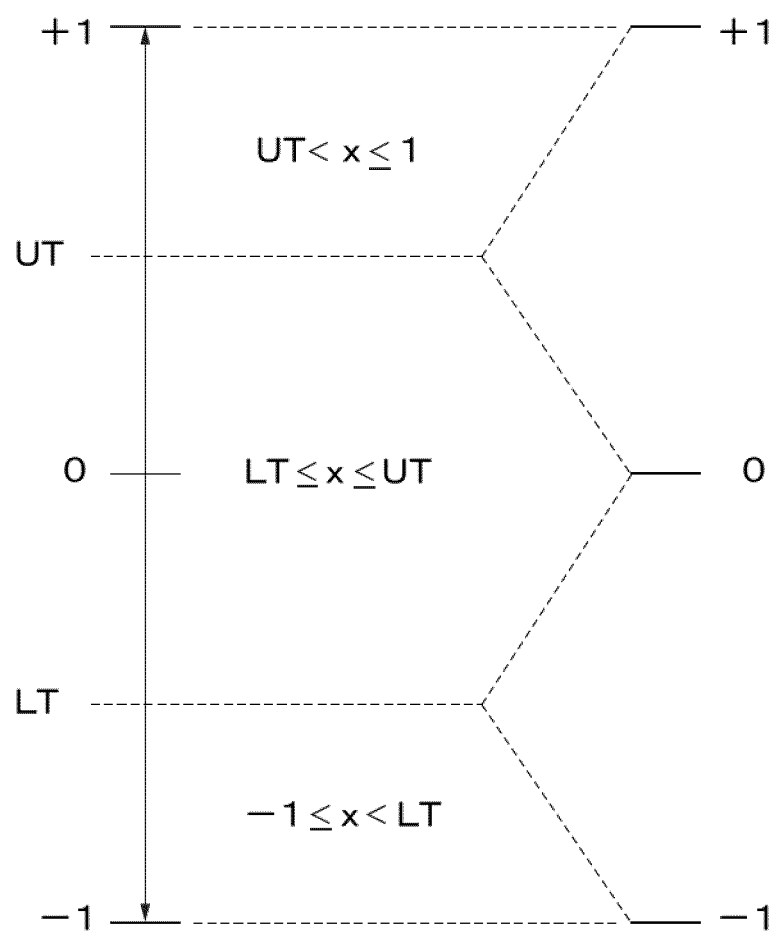
FIG. 28 is a diagram explaining a method for generating sub-problems in an expected-state search of the Ising model according to the present invention.

FIG. 28 is a diagram explaining a method of the sub-problem generation 120 according to the second embodiment. In the sub-problem generation 120, the interaction coefficients and the external magnetic field coefficients of the original problem are normalized to change them to real numbers within the range from −1 to +1 in the same manner as in the first embodiment (the processing in FIG. 6 of the first embodiment is also executed in the same manner in the second embodiment).

Of the processing in FIG. 6 of the first embodiment, operation in step S605 is different. FIG. 28 illustrates processing that should be executed in step S605 of the second embodiment.

Referring to FIG. 28, the normalized coefficient of the original problem is provided with two types of threshold values, UT (Upper Threshold) and LT (Lower Threshold) and the coefficient of the original problem is compared with the threshold values, thereby generating coefficients of sub-problems.

Specifically speaking, If the threshold value of the original problem exceeds UT, the coefficient of the sub-problem is set to +1. Furthermore, if the threshold value of the original problem is lower than LT, the coefficient of the sub-problem is set to −1. In neither of these cases, that is, if the coefficient of the original problem is equal to or more than LT or equal to or less than UT, the coefficient of the sub-problem is set to 0.

Figure 29:
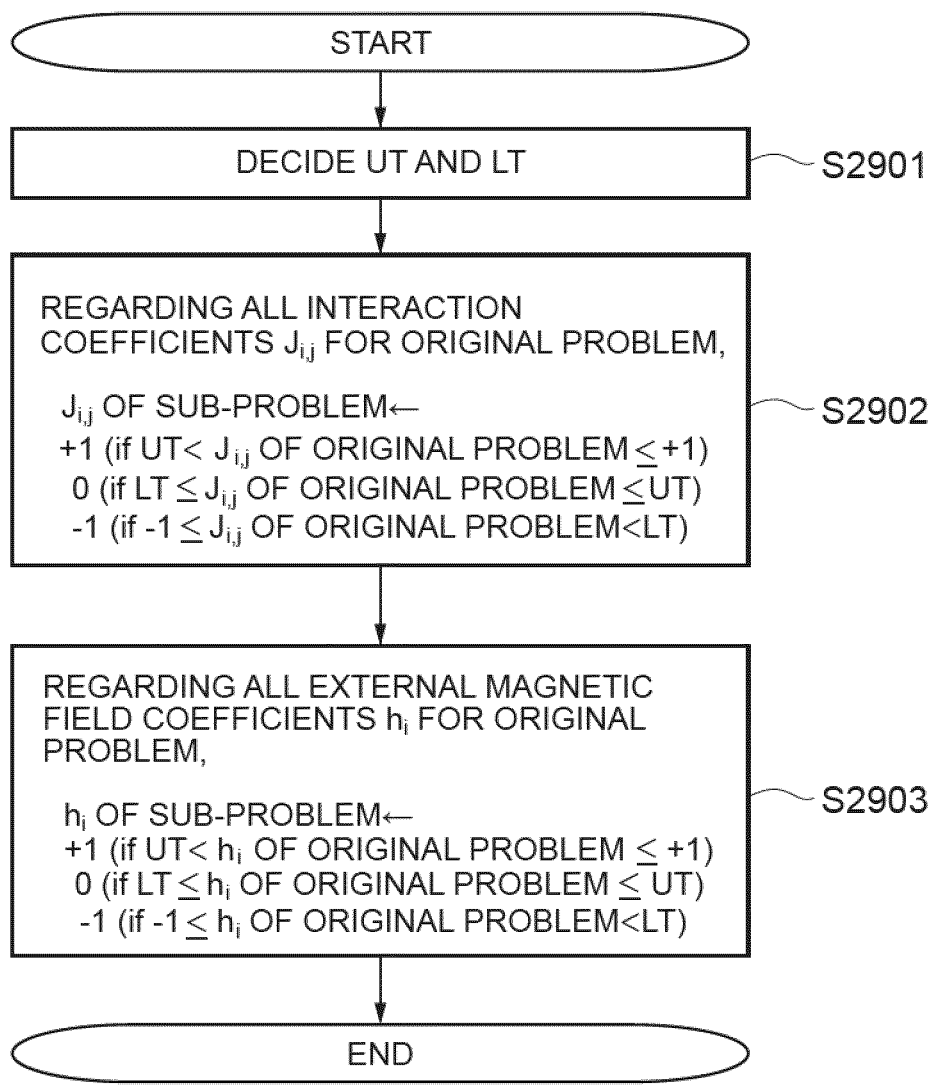
FIG. 29 is a flowchart illustrating an example of an algorithm for generating sub-problems in the ground-state search of the Ising model according to the present invention.

FIG. 29 is a flowchart illustrating the above-described processing. The flowchart in FIG. 29 corresponds to step S605 in FIG. 6 and is executed as many times as the number of sub-problems determined in step S603 in FIG. 6.

In step S2901, UT and LT are determined. The processing in FIG. 29 is executed as many times as the number of the sub-problems and different UT and LT are used every time.

In step S2902, UT and LT which are determined in step S2901 are used to round all the interaction coefficients of the original problem to the three values, +1, 0, −1, which are output as sub-problems.

In step S2903, UT and LT which are determined in step S2901 are used to round all the external magnetic field coefficients of the original problem to the three values, +1, 0, −1, which are output as sub-problems.

Figure 30:
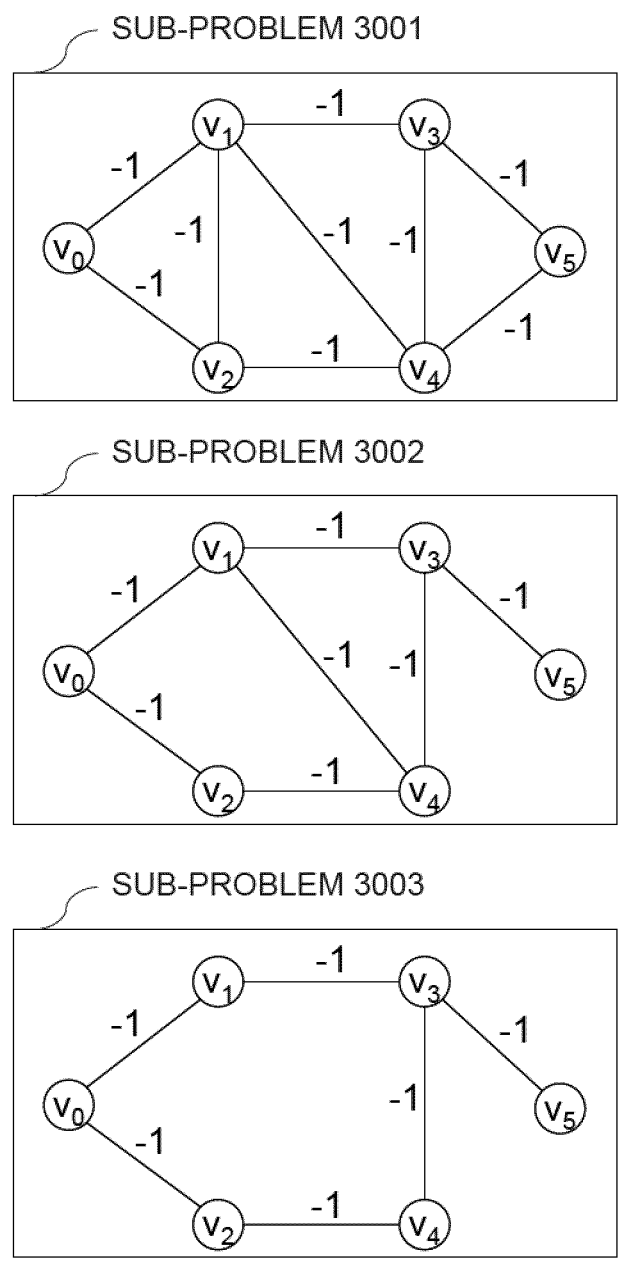
FIG. 30 is an example of data representing sub-problems generated from the original problem in FIG. 12.

FIG. 30 and FIG. 31 show examples in which the sub-problems are generated from the Ising model in FIG. 12 by the method shown in FIG. 28 and FIG. 29. In these examples where the numbered of sub-problems is 5 and a set of UT and LT is represented as (UT, LT), sub-problems 3001 to 3005 are generated by changing UT and LT as (0, 0) for the sub-problem 3001, (1, 1) for the sub-problem 3002, (2, 2) for the sub-problem 3003, (3, 3) for the sub-problem 3004, and (4, 4) for the sub-problem 3005.

FIG. 32 shows search results of the ground state of each sub-problem 3001 to 3005 (candidate solutions) and solutions of the original problem, which are generated from the candidate solutions.

Each candidate solution may be evaluated with the energy function of the original problem and the best candidate solution may be output as the solution 170 of the original problem in the same manner as in FIG. 8 of the first embodiment. In the case of this method, the candidate solutions for the sub-problem 3001 and the sub-problem 3002 show the best evaluation for the original problem and are selected as the solution 170.

Furthermore, as described in the first embodiment, a representative value (statistic) may be obtained for each spin with respect to a spin alignment of these candidate solutions and then a spin alignment of the solution 170 may be generated. The spin alignment shown as a mode in FIG. 32 (it should be noted that since the spin values are two values of +1 and −1, calculating an average value and rounding it to either +1 or −1, whichever closer, is the same as finding the mode) is obtained by adopting either +1 or −1, whichever is more in its quantity as a solution for each spin of the spin alignment of the candidate solutions for the sub-problems 3001 to 3005. In this example, the best evaluation for the energy function of the original problem can be obtained even by calculating the mode.

Alternatively, there is a method of deciding a spin value of the solution not just by calculating the mode, but according to the quantity of +1/−1 which is the spin value. Rows that show quantity 1, quantity 2, quantity 3, quantity 4, and quantity 5 in FIG. 32 count the quantity of the value −1 for each spin of the spin alignment of the candidate solutions for the sub-problems 3001 to 3005. For example, in a case of the quantity 2, the spin alignment is determined as: −1 if the quantity of −1 is two or more; and +1 if the quantity of −1 is less than two.

According to the present embodiment described above, the sub-problem generation 120 can be performed without using the random number. So, in addition to the advantageous effects obtained by the first embodiment, the sub-problem generation 120 can be performed more easily and, therefore, it is also possible to obtain the advantageous effect of generating the solution of the original problem 110 more easily.

(3) Other Embodiments

Incidentally, the aforementioned first and second embodiments have described the case where coefficients of Ising models whose ground state can be searched are limited by restrictions on hardware or software; however, the present invention is not limited to this example and can be also applied to a case where the types of coefficients of Ising models whose ground state can be searched are limited by restrictions on hardware or software.

In this case, with the sub-problem generation 120 in FIG. 1, a plurality of sub-problems 130-1 to 130-$k$ composed of Ising models having the types of coefficients whose ground state can be searched are generated from the original problem 110 and then solutions of these sub-problems 130-1 to 130-$k$ may be used as candidate solutions 150-1 to 150-$k$ to find a solution of the original problem 110 according to the procedures of the first and second embodiments.

INDUSTRIAL APPLICABILITY

The present invention can be applied to a wide variety of information processing units that perform the ground-state search of the Ising model.

REFERENCE SIGNS LIST 110 original problem; 120 sub-problem generation; 130-1 to 130-$k$, 3001 to 3005 sub-problems; 140-1 to 140-$k$ limited ground-state searches; 150-1 to 150-$k$ candidate solutions; 160 solution generation; 170 solution; 200, 2500 information processing unit; 210 CPU; 261 sub-problem generation command; 262 ground-state search accelerator; 263 solution generation command; 264 ground-state search program; 265, 1300 original problem data; 266-1 to 266-$k$, 1401 to 1403 sub-problem data; 267-1 to 267-$k$, 1601 to 1603 candidate solution data; 268, 1701, 1801 solution data; 270 ground-state search accelerator; 280-1, 280-2 Ising chips; 2520 limited ground-state search command; 3410 spin array; 3500 spin unit; N, IS0, IS1, IU0, IU1, IL0, IL1, IR0, IR1, ID0, ID1, IF0, IF1 memory cells; ISx, IUx, ILx, IRx, IDx, IFx the memory cell pairs; 3510 XNOR circuit; 3520 XOR circuit; 3530 majority logic circuit; 3540 OR circuit; 3550 selector circuit; $\sigma_i$, $\sigma_j$ spin; $h_i$ external magnetic field coefficient; and $J_{i,j}$, $J_{j,i}$ interaction coefficients.

What is claimed is:

1. An information processing apparatus for calculating a ground state which is a spin alignment with minimum energy of an original problem that is an Ising model, or an approximate solution of the ground state as a solution of the original problem, the information processing apparatus comprising a hardware processor coupled to a memory and a network interface card (NIC), the hardware processor configured to:

generate one or more sub-problems, which are Ising models, from the original problem;

control an Ising chip controller which controls one or more Ising chips each of which is a dedicated hardware, the one or more Ising chips configured to search for a ground state of a problem of an Ising model having specified multiple types of coefficient values and search for a ground state of each of the sub-problems; and generate the solution of the original problem based on a solution of each sub-problem obtained by the search made by the one or more Ising chips;

wherein the hardware processor is configured to generate the sub-problems which are the Ising models having one or more coefficient values selected from the multiple types based on one or more coefficient values of the Ising model of the original problem, and wherein the generating the one or more sub-problems further comprising the hardware processor configured to:

normalize each of the coefficient values of the Ising model of the original problem within a specified range;

generate a random number within the specified range;

compare each of the normalized coefficient values of the Ising model of the original problem with the random number; and determine a coefficient value selected from the multiple types based on a comparison result as a coefficient value of the Ising model of the sub-problem corresponding to each of the normalized coefficient values.

2. The information processing apparatus according to claim 1, wherein the generating the one or more sub-problems further comprising the hardware processor configured to:

calculate probability defined to make an expected value of the coefficient value of the sub-problem become the normalized coefficient value of the original problem;

generate a second random number within the specified range;

compare the probability of the Ising model of the normalized original problem with the second random number; and determine a second coefficient value selected from the multiple types based on a comparison result of comparing the probability with the second random number as a coefficient value of the Ising model of the sub-problem corresponding to each of the normalized coefficient values.

3. The information processing apparatus according to claim 1, wherein the hardware processor is further configured to:

evaluate the solution of each sub-problem with an energy function of the original problem; and determine the solution of the sub-problem with minimum energy as the solution of the original problem.

4. The information processing apparatus according to claim 1, wherein the hardware processor is further configured to determine a statistic in units of each spin of the solution of the sub-problem as the solution of the original problem.

5. The information processing apparatus according to claim 1, wherein the hardware processor is further configured to recognize a feature value as an average value or a mode.

6. An information processing apparatus for calculating a ground state which is a spin alignment with minimum energy of an original problem that is an Ising model, or an approximate solution of the ground state as a solution of the original problem, the information processing apparatus comprising a hardware processor coupled to a memory and a network interface card (NIC), the hardware processor configured to:

generate one or more sub-problems, which are Ising models, from the original problem;

control an Ising chip controller which controls one or more Ising chips each of which is a dedicated hardware, the one or more Ising chips configured to search for a ground state of a problem of an Ising model having specified multiple types of coefficient values and search for a ground state of each of the sub-problems; and generate the solution of the original problem based on a solution of each sub-problem obtained by the search made by the one or more Ising chips;

wherein the hardware processor is configured to generate the sub-problems which are the Ising models having one or more coefficient values selected from the multiple types based on one or more coefficient values of the Ising model of the original problem, and wherein the generating the one or more sub-problems further comprising the hardware processor configured to:

normalize each of the coefficient values of the Ising model of the original problem within a specified range;

compare the normalized coefficient value of the Ising model of the original problem with at least one or more preset threshold values; and determine a coefficient value selected from the multiple types based on a comparison result as a coefficient value of the Ising model of the sub-problem corresponding to each of the normalized coefficient values.

7. The information processing apparatus according to claim 6, wherein the hardware processor uses the threshold value which is different from each other in units of each sub-problem.

8. An information processing method executed by a hardware processor of an information processing unit that includes one or more Ising chips configured to search for a ground-state, which is a spin alignment to minimize energy of a problem of an Ising model having specified multiple types of coefficient values, and calculates a ground state of an original problem that is an Ising model, or an approximate solution of the ground state as a solution of the original problem, the information processing method comprising:

generating, by the hardware processor coupled to a memory and a network interface card (NIC), one or more sub-problems, which are Ising models, from the original problem which is the Ising model;

searching, by the one or more Ising chips each of which is a dedicated hardware, for the ground state of each of the sub-problems; and generating, by the hardware processor, the solution of the original problem based on a solution of each sub-problem obtained by the search;

wherein in the generating of the one or more sub-problems, the sub-problem which is an Ising model composed of one or more coefficient values selected from the multiple types are generated based on one or more coefficient values of the Ising model of the original problem, and wherein in the generating of the one or more sub-problems, each of the coefficient values of the Ising model of the original problem is normalized within a specified range;

a random number is generated within the specified range;

each of the normalized coefficient values of the Ising model of the original problem is compared with the random number; and a coefficient value selected from the multiple types based on a comparison result is determined as a coefficient value of the Ising model of the sub-problem corresponding to each of the normalized coefficient values.

9. The information processing method according to claim 8, wherein in the generating of the one or more sub-problems,
probability defined to make an expected value of the coefficient value of the sub-problem become the normalized coefficient value of the original problem is calculated;
a second random number within the specified range is generated;
the probability of the Ising model of the normalized original problem is compared with the second random number; and
a second coefficient value selected from the multiple types based on a comparison result of comparing the probability with the second random number is determined as a coefficient value of the Ising model of the sub-problem corresponding to each of the normalized coefficient values.

10. The information processing method according to claim 8, wherein in the generating of the one or more sub-problems,
the normalized coefficient value of the Ising model of the original problem is compared with at least one or more preset threshold values; and
a second coefficient value selected from the multiple types based on a comparison result of comparing the normalized coefficient value with the at least one or more preset threshold values is determined as a coefficient value of the Ising model of the sub-problem corresponding to each of the normalized coefficient values.

11. The information processing method according to claim 10, wherein the threshold values which are different from each other in units of each sub-problem are used in the generating of the one or more sub-problems.

12. The information processing method according to claim 8, wherein in the generating of the solution of the original problem,
the solution of each sub-problem is evaluated with an energy function of the original problem; and
a solution of the sub-problem with minimum energy is determined as a solution of the original problem.

13. The information processing method according to claim 8, wherein in the generating of the solution of the original problem, a statistic of each spin of the solution of the sub-problem is determined as a solution of the original problem.

* * * * *